United States Patent
Gorman et al.

(10) Patent No.: US 10,042,862 B2
(45) Date of Patent: Aug. 7, 2018

(54) METHODS AND SYSTEMS FOR CONNECTING A SOCIAL NETWORK TO A GEOSPATIAL DATA REPOSITORY

(75) Inventors: Sean Gorman, Arlington, VA (US); Christopher Ingrassia, Clearwater, FL (US); Pramukta Kumar, Bethesda, MD (US); Minh Ngyuen, Manassas Park, VA (US)

(73) Assignee: ESRI TECHNOLOGIES, LLC, Redlands, CA (US)

( * ) Notice: Subject to any disclaimer, the term of this patent is extended or adjusted under 35 U.S.C. 154(b) by 7 days.

(21) Appl. No.: 12/030,028

(22) Filed: Feb. 12, 2008

(65) Prior Publication Data

US 2008/0294678 A1    Nov. 27, 2008

Related U.S. Application Data

(60) Provisional application No. 60/889,608, filed on Feb. 13, 2007.

(51) Int. Cl.
 *G06F 17/30* (2006.01)
 *G06Q 10/10* (2012.01)

(52) U.S. Cl.
 CPC .... *G06F 17/30241* (2013.01); *G06F 17/3087* (2013.01); *G06Q 10/10* (2013.01)

(58) Field of Classification Search
 CPC ................................................ G06F 17/30241
 USPC ................................ 707/999.003, 918–921
 See application file for complete search history.

(56) References Cited

U.S. PATENT DOCUMENTS

| | | |
|---|---|---|
| 5,355,442 A | 10/1994 | Paglieroni et al. |
| 5,781,704 A | 7/1998 | Rossmo |
| 6,084,989 A | 7/2000 | Eppler |
| 6,421,668 B1 | 7/2002 | Yakhini et al. |
| 6,424,933 B1 | 7/2002 | Agrawala |
| 6,535,227 B1 | 3/2003 | Fox et al. |
| 6,640,103 B1 | 10/2003 | Inman et al. |
| 6,804,394 B1 | 10/2004 | Hsu |
| 6,868,421 B1 | 3/2005 | Lin |
| 6,907,392 B2 | 6/2005 | Bennis et al. |
| 6,915,211 B2 | 7/2005 | Kram et al. |
| 6,952,661 B2 | 10/2005 | Agrawala |
| 6,985,929 B1 | 1/2006 | Wilson et al. |
| 7,035,933 B2 | 4/2006 | O'Neal et al. |

(Continued)

FOREIGN PATENT DOCUMENTS

| | | |
|---|---|---|
| JP | 2001-222613 | 8/2001 |
| JP | 2001-229186 | 8/2001 |

(Continued)

OTHER PUBLICATIONS

Notice of Allowance of U.S. Appl. No. 10/902,416, dated Mar. 5, 2010.

(Continued)

*Primary Examiner* — Brittany N Allen
(74) *Attorney, Agent, or Firm* — DLA Piper LLP (US)

(57) ABSTRACT

A system and method for connecting a social network to a geospatial data repository, comprising: accepting geospatial data from a user; linking the geospatial data to the user in the social network; and allowing the geospatial data to be searched and/or combined with other geospatial data from the user or other users in the social network.

20 Claims, 24 Drawing Sheets
(6 of 24 Drawing Sheet(s) Filed in Color)

(56) References Cited

U.S. PATENT DOCUMENTS

| | | | |
|---|---|---|---|
| 7,062,084 B2 | 6/2006 | Messing et al. | |
| 7,120,620 B2 | 10/2006 | Dumas et al. | |
| 7,152,105 B2 | 12/2006 | McClure et al. | |
| 7,177,882 B2 | 2/2007 | Xie et al. | |
| 7,180,516 B2 | 2/2007 | Kapler et al. | |
| 7,181,406 B1 | 2/2007 | Modest | |
| 7,212,670 B1 | 5/2007 | Rousselle | |
| 7,330,787 B2 | 2/2008 | Agrawala | |
| 7,400,770 B2 | 7/2008 | Keaton | |
| 7,467,147 B2* | 12/2008 | Irish et al. | 707/10 |
| 7,529,195 B2 | 5/2009 | Gorman | |
| 7,664,298 B2 | 2/2010 | Lang | |
| 7,778,808 B2 | 8/2010 | Miller et al. | |
| 7,822,426 B1 | 10/2010 | Wuersch | |
| 7,965,902 B1 | 6/2011 | Zelinka | |
| 7,983,474 B2 | 7/2011 | Van Workum et al. | |
| 8,018,458 B2 | 9/2011 | Peterson | |
| 8,060,582 B2 | 11/2011 | Bliss et al. | |
| 8,160,893 B2 | 4/2012 | Cardno | |
| 8,422,399 B2 | 4/2013 | Gorman | |
| 2001/0048435 A1 | 12/2001 | Deering et al. | |
| 2002/0055926 A1* | 5/2002 | Dan | G01C 21/20 |
| 2002/0072993 A1 | 6/2002 | Sandus et al. | |
| 2002/0112232 A1 | 8/2002 | Ream et al. | |
| 2002/0112237 A1 | 8/2002 | Kelts | |
| 2003/0061211 A1* | 3/2003 | Shultz et al. | 707/3 |
| 2003/0090485 A1 | 5/2003 | Snuffer | |
| 2003/0197877 A1 | 10/2003 | Lee | |
| 2003/0231174 A1 | 12/2003 | Matusik et al. | |
| 2004/0239681 A1 | 12/2004 | Robotham | |
| 2004/0260510 A1* | 12/2004 | Du | 702/179 |
| 2005/0033742 A1 | 2/2005 | Kamvar | |
| 2005/0100220 A1 | 5/2005 | Keaton | |
| 2005/0187711 A1 | 8/2005 | Agrawala | |
| 2005/0193430 A1 | 9/2005 | Cohen et al. | |
| 2005/0201405 A1 | 9/2005 | Liu | |
| 2005/0278386 A1 | 12/2005 | Kelly et al. | |
| 2005/0283525 A1 | 12/2005 | O'Neal et al. | |
| 2006/0026170 A1 | 2/2006 | Kreitler et al. | |
| 2006/0078205 A1 | 4/2006 | Porikli et al. | |
| 2006/0085419 A1 | 4/2006 | Rosen | |
| 2006/0129538 A1* | 6/2006 | Baader et al. | 707/3 |
| 2006/0136127 A1 | 6/2006 | Coch et al. | |
| 2006/0229058 A1 | 10/2006 | Rosenberg | |
| 2006/0241860 A1* | 10/2006 | Kimchi | G01C 21/26 701/532 |
| 2006/0271281 A1* | 11/2006 | Ahn et al. | 701/208 |
| 2007/0143345 A1* | 6/2007 | Jones | G06F 17/30241 |
| 2007/0168370 A1 | 7/2007 | Hardy | |
| 2007/0171716 A1* | 7/2007 | Wright et al. | 365/185.12 |
| 2007/0218900 A1* | 9/2007 | Abhyanker | 455/435.1 |
| 2007/0263007 A1 | 11/2007 | Robotham | |
| 2007/0281690 A1 | 12/2007 | Altman et al. | |
| 2007/0291994 A1 | 12/2007 | Kelle | |
| 2008/0016472 A1* | 1/2008 | Rohlf et al. | 715/848 |
| 2008/0086464 A1 | 4/2008 | Enga | |
| 2009/0132469 A1 | 5/2009 | White et al. | |
| 2010/0085350 A1 | 4/2010 | Mishra et al. | |
| 2011/0191284 A1 | 8/2011 | Dalton | |
| 2011/0316854 A1 | 12/2011 | Vandrovec | |

FOREIGN PATENT DOCUMENTS

| | | |
|---|---|---|
| JP | 2003-523030 | 7/2003 |
| WO | WO 00/70463 | 11/2000 |
| WO | WO 01/59989 | 8/2001 |
| WO | WO 2009/137126 | 11/2009 |

OTHER PUBLICATIONS

Tarboton, et al., "Advances in the mapping of flow networks from digital elevation data", Utah Water Research Laboratory, (May 20, 2001).

Pu, et al., "Routing Reliability Analysis of Partially Disjoint Paths", University of Victoria, Victoria, Canada.

Gomes, et al., "An Algorithm for Calculating the K Most Reliable Disjoint Paths with a Maximum Number of Arcs", University of Columbia, Portugal.

Cohen, et al., "Breakdown of the Internet under intentional attack", Phys. Rev. Lett 86, 3682 (2001).

Albert, et al., "Error and attack tolerance of complex networks", Nature 406, 378-382 (2000).

S.H. Yook, H. Jeong, A.L. Barabási, "Modeling the Internet's Large-Scale Topology", Dept. of Physics, University of Notre Dame, Notre Dame, IN 46556, USA.

Watts, et al., "Collective dynamics of small-world networks", Nature 363:202-204 (1998).

Latora, et al., "Is the Boston sybway a small-world network?", Physica A 314:109-111, (2002).

Lakhina, et al., "On the geographic locations of Internet resources". Notice of Allowance issued in U.S. Appl. No. 10/902,283 dated Jul. 18, 2008.

M.J. Egenhofer, T. Bruns, "Visual Map Algebra: A Direct-Manipulation User Interface for GIS", *Proc. 3th IFIP 2.6 workingconference on visual database systems* (IFIP'95), Lausanne, Switzerland, Mar. 27-29, 1995, S. Spaccapietra, R. Jain (eds.), *Visual Database Systems 3, Visual Information Management*, IFIP Conference Proceedings 34 Chapman & Hall, pp. 235-253, 1995.

Bruns, T.H. and Egenhofer, M.J. *User Interfaces for Map Algebra*, Journal of the Urban and Regional Information Systems Association, vol. 9, No. 1, pp. 44-54, 1997.

D. Pullar, "MapScript: A Map Algebra Programming Language Incorporating Neighborhood Analysis," *Geonformatica*, vol. 5, pp. 145-163, 2001.

International Search Report issued in Application No. PCT/US07/077985 dated Mar. 12, 2008.

Written Opinion issued in Application No. PCT/US07/077985 dated Mar. 12, 2008.

International Search Report issued in Application No. PCT/US08/053727 dated Jul. 25, 2008.

Written Opinion issued in Application No. PCT/US08/053727 dated Jul. 25, 2008.

Adamic, L, 2000, "Zipf, Power-laws, and Pareto—a ranking tutorial" *Internet Ecologies Area—Parc Xerox* http://ginger.hpl.hp.com/shl/papers/ranking/ranking.html.

Albert R, Jeong H, Barabasi A, 1999, "The diameter of the World Wide Web" *Nature* 401: 130-131.

Albert R, Barabasi A, 2000, "Topology of evolving networks: Local Events and Universality" *Physical Review Letters* 85: (24) 5234-5237.

Albert R, Barabási, A, 2002, "Statistical mechanics of complex networks" *Reviews of Modern Physics* 74: 47-97.

Amaral L, Scala A, Barthelemy M, Stanley H, 2000, "Classes of small-world networks" *Proceedings of the National Academy of Sciences* 97 (21): 11149-11152.

Arthur WB, 1999, "Complexity and the economy" *Science* 284: 107-109.

Barabasi A, 2002, *Linked: The New Science of Network*. (Perseus Publishing, New York, NY).

Barabasi A, 2001, "The physics of the Web" *Physics World* Jul. 2001 http://www.physicsweb.org/article/world/14/7/09.

Barabasi A, Albert A, 1999, "Emergence of scaling in random networks" *Science*, Oct. 21, 1999.

Batty M, 2001, "Editorial: Cities as small worlds" *Environment and Planning B: Planning and Design* 28: 637-638.

Beaverstock JV, Smith RG, Taylor PJ, 2000, "World-city network: a new metageography?" *Annals of the Association of American Geographer* 90: 123-134 http://www.jstor.org/pss/1515383.

Bollobás B, 1985, *Random Graphs*. (Academic Press, New York).

Borgatti SP, Everett MG, Freeman LC, 2002, Ucinet for Windows: Software for Social Network Analysis. Harvard: Analytic Technologies http://www.analytictech.com/ucinet/ucinet_5_description.htm.

Cahn RS, 1999, *Wide Area Networks: Concepts and Tools for Optimization*. (San Francisco, CA: Morgan Kaufmann Publishers Inc.).

(56) References Cited

OTHER PUBLICATIONS

Caida (1998) "Mapnet: Macroscopic Internet Visualization and Measurement" *CAIDA* http://www.caida.org/tools/visualization/mapnet/.
Chen Q, Hyunseok C, Govindan R, Sugih J, Schenker S, Willinger W, "The origin of power laws in Internet topologies revisited," *Proceedings of IEEE infocom 2002*.
Junho H. Choi et al., "Comparing World City Networks: A Network Analysis of Internet Backbone and Air Transport Intercity Linkages", Global Networks, vol. 6, No. 1, pp. 81-99 (2006).
Economist, 2001, "Drowning in glass" *The Economist* Mar. 22nd—http://www.economist.com/business/displayStory.cfm?Story_ID=540709.
Erdos P, Renyi A, 1960, On the evolution of random graphs. *Publication of the Mathematical Institute of the Hungarian Academy of Science* vol. 5 pp. 17-67.
Faloutsos C, Faloutsos P, Faloutsos M, 1999, "On Power-Law Relationships of the Internet Topology", *Computer Communication Review*.
Garrison W. 1968, "Connectivity of the interstate highway system" in Berry B, Marble D, 1968, *Spatial Analysis*. (Englewood Cliffs, NJ: Prentice Hall) pp. 239-249.
Gilder G, 2000, *Telecosm*. (New York: Free Press, 2000).
Gorman SP, Malecki EJ, 2000, "The networks of the Internet: an analysis of provider networks in the USA" *Telecommunications Policy* 24: 113-134 (2000).
Gorman, SP, Malecki EJ, "Fixed and Fluid: Stability and Change in the Geography of the Internet" *Telecommunications Policy* 26, 389-413 (2002).
Gorman, SP and McIntee A, "Tethered connectivity? The spatial distribution of wireless infrastructure" *Environment and Planning A* 2003, vol. 35, pp. 1157-1171.
Haggett P, Chorley R, 1969, *Network Analysis in Geography*. (New York: St. Martins Press).
Hayes B, 2000a, "Graph theory in practice: Part I" *American Scientist* 88 (01): 9-13 http://www.americanscientist.org/issues/num2/graph-theory-in-practice-part-i/1.
Hayes B, 2000b, "Graph theory in practice: Part II" *American Scientist* 88 (02): 104-109 http://www.americanscientist.org/issues/pub/graph-theory-in-practice-part-ii/1.
Huberman B, Adamic L, 1999, "Growth Dynamics of the World Wide Web" *Nature* 401:131-134.
Kansky K, 1963, *Structure of Transportation Networks: Relationships Between Network Geometry and Regional Characteristics*. (University of Chicago, Department of Geography, Research Papers).
Lakhina, A, Byers, JW, Crovella, M, Matta, I, 2002, "On the Geographic Locations of Internet Resources" http://www.cs.bu.edu/techreports/pdf/2002-015-internetgeography.pdf.
Malecki EJ, 2002, "The Economic Geography of the Internet's Infrastructure," *Economic Geography*, vol. 78, No. 4, pp. 399-424.
Malecki EJ, Gorman SP, "Maybe the death of distance, but not the end of geography: the Internet as a network", in SD Brunn, TR Leinbach, (eds.) *The Worlds of Electronic Commerce*. (New York: John Wiley) pp. 87-105 (2001).
Milgram S, 1977, The small world problem. in *The individual in a Social World: Essays and Experiments*, Milgrim, S, Sabini, J, (Eds) pp. 281-295. Reading, MA: Addison-Wesley.
Moss ML and Townsend A, 2000, "The Internet backbone and the American metropolis" *The Information Society* 16: 35-47.
Paltridge S, 2002, "Internet traffic exchange and the development of end-to-end international telecommunications competition" (OECD: Working Paper).
Radoslavov P, Tangmunarunkit H, Yu H, Govindan R, Schenker S, Estrin D, 2000, "On characterizing network topologies and analyzing their impact on protocol design" *Tech Report 00-731*, University of Southern California, Dept. of CS.
Seidman, S, 1983, "Internal cohesion of LS sets in graphs." *Social Networks* 5:97-107.
Simon HA, Bonini CP, 1958, "The size distribution of business firms" *The American Economic Review* 48: 607-617.
Stoneham, AKM, 1977, "The small-world problem in a spatial context" *Environment and Planning A* 9: 185-195.
Tangmunarunkit H, Govindan R, Jamin S, Schenker S, and Willinger W, 2001, "Network topologies, power laws, and hierarchy" *Tech Report USC-CS-01-746*—http://isi.edu/~hongsuda/pu... USCTech01_746.ps.
Telegeography, 2002, *Packet Geography 2002: Global Internet Statistics and Comments*. Telegeography Inc: 1909 K St., NW Suite 380 Washington, DC 20006 USA http://www.telegeography.com/products/books/pg/index.html.
Townsend A, 2001, "Network cities and the global structure of the Internet" *American Behavioral Scientist* 44 (10): 1697-1716.
Wasserman, S. and Faust, K., 1994, *Social Network Analysis: Methods and Applications* (Cambridge Univ. Press, Cambridge).
Watts DJ, *Small Worlds: The Dynamics of Networks between Order and Randomness* (Princeton University Press, Princeton, NJ) (1999).
Watts, DJ, 2003, *Six Degrees: The Science of a Connected Age* (W.W. Norton, New York, NY).
Yook SH, Jeong H, Barabási AL, 2001, "Modeling the Internet's Large-Scale Topology" http://xxx.lanl.gov/abs/cond-mat/0107417.
Zipf PK, *Human Behavior and the Principle of Least Effort*; Addison-Wesley, Cambridge, MA; pp. 445-516 (1949).
Gao, L., 2001, On inferring autonomous system relationships in the Internet. *IEEE/ACM Transactions on networking* 9(6): 733.
The White House: *The National Strategy to Secure Cyberspace*.
NRC, 2002, *Cybersecurity Today and Tomorrow: Pay Now or Pay Later Washington*, DC: National Academy Press.
NSTAC, 2002, *Network Security/Vulnerability Assessments Task Force Report Washington, DC*: The President's National Security Telecommunications Advisory Committee—http://www.ncs.gov/nstac/NSVATF-Report-(FINAL).htm.
Moore, D., Paxson, V., Savage, S., Colleen, S., Staniford, S., and Weaver, N. 2003, *The spread of the Sapphire/Slammer worm*. CAIDA—http://www.caida.org/outreach/papers/2003/sapphire/sapphire.html.
Magoni, D. and Pansiot, J.J., 2001, Analysis of the Autonomous system network topology. *Proceedings of ACM SIGCOMM'01*.
Callaway, D.S., Newman, M.E.J., Strogatz, S.H., and Watts, D.J., 2000, "Network robustness and fragility: percolation on random graphs.," *Physical Review Letters* 85 (25): 5468-5471.
Gorman, S.P. and Kulkarni, R., Spatial small worlds: New geographic patterns for an information economy. *Environment and Planning B Planning and Design 2004*, vol. 31, pp. 273-296.
Gorman, S.P., Schintier, L.A., Kulkarni, R.G., and Stough, R.R., *The revenge of distance: Vulnerability analysis of critical information infrastructure*. in submission (2002).
Grubesic, T.H., O'Kelly, M.E., and Murray, A.T., (2003) A geographic perspective on telecommunication network survivability. *Telematics and Informatics* 20(1): 51-69.
Cliff A., Haggett P., and Ord K. Graph theory and geography. In: Wilson R. and Beineke L. (Eds) *Applications of graph theory*. London: Academic Press, pp. 293-326 (1979).
Lawyer, G., 2003, The battle of the bug: Government, industry move to protect Internet from cyber attacks, viruses. http://www.xchangemag.com/articles/1B1front4.html.
Pastor-Satorras, R., Vespignani, A., 2001, Epidemic dynamics and endemic states in complex networks. *Physical Review/E* 63: 066117.
Moreno, Y., Vazquez, A., 2003, *Disease spreading in structured scale free networks*. The European Physical Journal B 31:265-271.
Dezsos, A., Barabasi, A.L., 2002, *Halting viruses in scale-free networks*. Physical Review E 65:055103 (R).
Newman, M.E.J., Forest, S., and Balthrop, J., 2002, Email networks and the spread of computer viruses. *Physical Review* E 66: 035101(R).
Hunker, J., 2002, Policy challenges in building dependability in global infrastructures. *Computers & Security* 21 (8): 705-711.

(56) References Cited

OTHER PUBLICATIONS

Dinc M., Haynes K.E., Stough R.R., and Yilmaz S., 1998, Regional universal telecommunication service provisions in the US—Efficiency versus penetration. *Telecommunications Policy* 22 (6): 541-553.
Tarjanne, P., 1999, Preparing for the next revolution in telecommunications: implementing the WTO agreements Policy 22(6): 541-553.
Pastor-Satorras, R., and Vespignani, A., 2002, Immunization of complex networks. *Physical Review* E 65:036104-1.
Moore, D., Shannon, C., Voelker, G.M., and Savage, S., 2003, *Internet quarantine: Requirements for containing self-propagating code.* INFOCOM 2003 http://www.caida.org/outreach/papers/2003/quarantine/.
Atkinson, R. (1998) "Technological Change and Cities.," *Cityscape: A Journal of Policy Development and Research* 3 (3): 129-170.
Bhandari, R. (1999) *Survivable Networks: Algorithms for Diverse Routing.* Boston: Kluwer Academic Press.
Brunn, S D. and Leinbach, T R. (1991) Collapsing Space & Time: *Geographic Aspects of Communication & Information.* New York: Harper Collins Academic.
Cairncross, F. (1997) *The Death of Distance.* Boston: Harvard Business School Press.
Castells, M. (1989) *The Informational City.* Oxford, UK: Blackwell.
Falk, T., Abler, R. (1980) Intercommunications, Distance, and Geographical Theory. *Geografiska Annaler*, Series B, 62: 35-56.
Gillespie, A. and Robins, K. (1989) Geographical Inequalities: The Spatial Bias of the New Communications Technologies. *Journal of Communications* 39 (3): 7-18.
Kunreuther, H., Heal, G. and Orszag, P. (2002), "Interdependent Security: Implications for the Homeland Security Policy and Other Areas," *The Brookings Institute*, Policy Brief #108.
Lowe, J. and Moryadas, S. (1975) *The Geography of Movement.* Prospect Heights, IL: Waveland Press.
Malecki, E,J.; The Internet Age: Not the End of Geography, in D. Felsenstein and M.J. Taylor, eds. *Promoting Local Growth: Process, Practice and Policy.* Aldershot: Ashgate, 2001; pp. 227-253.
Malecki, E.J. (2002) The Internet: A preliminary analysis of its evolving economic geography, *Economic Geography*, vol. 78, No. 4, pp. 399-424.
Medina, A., Matta, I., and Byers, J. (2000) On the origin of power—laws in Internet topologies. *ACM Computer Communications Review* 30(2).
Moss, M.L. and Townsend, A. (1997) Tracking the net: using domain names to measure the growth of the Internet in US cities. *Journal of Urban Technology* 4(3): 47-60.
Negroponte, N. (1995) *Being Digital.* New York: Alfred A. Knopf.
Pansiot, J. and Grad, D. (1998) On routes and multicast trees in the Internet. *ACM SIGCOMM Computer Communications Review* 28(1): 41-50.
Paxson, V. (1996) End-to-end routing behavior in the Internet. *Proceedings of the ACM SIGCOMM 96'* Sept: 25-38.
Redner, S. (1998) How popular is your paper? An empirical study of the citation distribution. *European Physical Journal B* 4: 131-134.
Yasin, R.; Gov't to map infrastructure. Internetweek.com http://www.internetweek.com/story/INW20011206S0001 (2001).
Schintler, L., Kulkarni, R., Gorman, S.P., and Stough, R.; Power and Packets: A Spatial network Comparison of the US Electric Power Grid and Internet Network, pp. 35-60 (2004).
Amin, M, 2001, "Toward self-healing energy infrastructure systems," *IEEE Computer Applications in Power* 14(1): 20-28.
Berry B, Marble D, 1968, *Spatial Analysis.* Englewood Cliffs, NJ: Prentice Hall.
Christaller, W. (1933) *Central Places in Southern Germany.* Jena, Germany: Fischer (English Translation by C.W. Baskin, London: Prentice Hall, 1966).
Collins J, 2002, "Dominant Cisco grows router market share" *Personal Computer World* http://www.pcw.co.uk/News/1131853.

Elmes G, "The changing geography of electric energy in the United States—Retrospect and prospect" *Geography* 81 (4): 347-360 (1996).
FCC Network Outage Reporting System: User Manual, Nov. 30, 2004.
Gao Jan. 2003, "Critical infrastructure protection: Efforts of the financial services sector to address cyber threats", *Report to the Subcommittee on Domestic Monetary Policy, Technology, and Economic Growth; Committee on Financial Services, House of Representatives.*
Halsne C. 2003, "North Sound 911 Service Repeatedly Targeted" *KIRO TV* http://www.kirotv.com/news/2601577/detail.html.
Huitema C, 1995, *Routing in the Internet* Englewood, CA: Prentice Hall.
Knox PL, Taylor PJ, 1995, *World Cities in a World-System* New York: Cambridge University Press.
Langdale JV, 1989, "The geography of international business telecommunications: The role of leased networks" *Annals of the Association of American Geographers* 79(4): 501-522.
Lerten B, 2003, "Tower saboteur I was only pointing out flaws" *The Bend Bugle* Nov. 23 http://bend.com/news/ar_view/\3Far_id/\3D12260.htm.
Leyshon A, 1996, "Financial exclusion and the shifting boundaries of the financial system" *Environment and Planning A* 28(7): 1150-1156.
Lindstron A, "Tunnel Vision?" Broadbandweek.com http://www.broadbandweek.com/news/010806/010806_news_fiber.htm (2001).
Longcore T, Rees P, 1996, "Information technology and downtown restructuring: The case of New York City's financial district" *Urban Geography* 17: 354-372 Maine PUC, 2003, http://www.state.me.us/mpuc/misctranscripts/2002-43%20080503.htm.
Moss, M. (1998) Technologies and Cities. *Cityscape: A Journal of Policy Development and Research* 3: 107-127.
Neuman P, 1991, "NY area fiber-optic telephone cable severed; extensive effects" *The Risk Digest* 10:75 http://catless.ncl.ac.uk/Risks/10.75html#subj1.
Neuman P, 2000, "Week-long outage after cable cut downs 11,000 phone lines" *The Risk Digest* 20:84 http://catless.ncl.ac.uk/Risks/20.84html#subj6.1.
Neuman R, 2002, "Wall street worries" *U.S. News & World Reports* Sep. 23.
NIST, 1995, *The Impact of the FCC's Open Network Architecture on NS/NP Telecommunications Security* Washington DC: National Institute of Standards and Technology http://csrc.nist.gov/publications/nistpubs/800-11/titleona.html.
Nyusten JD, Dacey MF, 1968, A graph theory interpretation of nodal regions. In Berry B, Marble, D, 1968, *Spatial Analysis* Englewood Cliffs, NJ: Prentice Hall 407-418.
O'Kelly ME, Grubesic TH, (2002) Backbone topology, access, and the commercial Internet, 1997-2000. *Environment and Planning B* 29(4): 533-552.
PSERC, 2003, "Public Utilities Commission of Ohio, sequence of events on Aug. 14, 2003" http://www.pserc.wisc.edu/Ohio_Only_Sequence_of_Events.pdf.
Cowie, et al., Impact of the 2003 Blackouts on Internet Communication: Preliminary Report, Nov. 21, 2003 (21 pages).
Warr B, 1995, "Telecommunications and the changing geographies of knowledge transmission in the late 20th century" *Urban Studies* 32(2): 361-378.
Wheeler DC, O'Kelly ME, 1999, "Network topology and city accessibility of the commercial Internet" *Professional Geographer* 51: 327-339.
Malecki, EJ, "Fibre tracks: explaining investment in fibre optic backbones" *Entrepreneurship & Regional Development*, Jan. 16, 2004, 21-39.
Evans-Cowley, J, Malecki, EJ, and McIntee, A 2002, "Planning Responses to Telecom Hotels: What Accounts for Increased Regulation of Co-location Facilities?", *Journal of Urban Technology*, vol. 9, No. 3, pp. 1-18.
International Search Report issued in Application No. PCT/US2005/026752 dated Dec. 22, 2006.
Written Opinion issued in Application No. PCT/US2005/026752 dated Dec. 22, 2006.

(56) References Cited

OTHER PUBLICATIONS

International Preliminary Report on Patentability issued in Application No. PCT/US2005/026752 dated Dec. 22, 2006.
Odlyzko, A.M., "Comments on the Larry Roberts and Caspian Networks Study of Internet Traffic Growth", The Cook Report on the Internet, (2001) pp. 12-15.
Notice of Allowance issued in U.S. Appl. No. 10/902,283 dated Dec. 30, 2008.
Pallas R. et al.: "A pragmatic approach to debris flow hazard mapping in areas affected by Hurricane Mitch: example from NW Nicaragua", Engineering Geology, Elsevier Science Publishers, Amsterdam, NL. vol. 72, No. 1-2, Mar. 1, 2004 (Mar. 1, 2004), pp. 57-72.
European Search Report issued in Application No. 05777205.5 dated Dec. 23, 2008.
International Preliminary Report on Patentability issued in Application No. PCT/US07/077985 dated Mar. 19, 2009.
International Preliminary Report on Patentability issued in Application No. PCT/US08/053727 dated Aug. 27, 2009.
Supplemental Notice of Allowance issued in U.S. Appl. No. 10/902,283, dated Feb. 25, 2009.
Notice of Allowance of U.S. Appl. 10/902,416, dated Sep. 24, 2009.
Office Action issued in U.S. Appl. No. 10/902,416 dated Dec. 16, 2008.
File History of U.S. Appl. No. 10/902,283.
File History of U.S. Appl. No. 10/902,416.
John D. Nystuen et al., "A Graph Theory Interpretaton of Nodal Regions", Papers and Proceedings of the Regional Science Association, vol. 7, pp. 29-42 (1961).
European Search Report issued in EP 07 84 2124, dated Jul. 8, 2011.
Markus Neteler et al., "Open Source GIS: A Grass GIS Approach: Second Edition", Kluwer Academic Publishers, Boston, pp. 54-130, 151-183, and 234-239 (2004).
Andrew Nelson, "Analysing Data Across Geographic Scales in Honduras: Detecting Levels of Organisation Within Systems", Agriculture, Ecosystems and Environment, vol. 85, pp. 107-131 (2001).
Taaffe, E.J. and Gauthier, H.L. *Geography of Transportation*. Englewood Cliffs, NJ: Prentice Hall (1973).
Ickjai Lee et al., "Polygonization of Point Clusters Through Cluster Boundary Extraction for Geographical Data Mining", Symposium on Geospatial Theory, Processing and Applications (2002) (14 Pages).
Shashi Shekhar et al., "Spatial Contextual Classification and Prediction Models for Mining Geospatial Data", IEEE Transactions on Multimedia, vol. 4, No. 2, pp. 174-188 (Jun. 2002).
Christopher Torpelund-Bruin et al., "Segmentation and Mapping of User-Driven Geospatial Web Data", 2010 6th International Conference on Advanced Information Management and Service (IMS), pp. 73-77 (2010).
DJ Watts et al., "Collective dynamics of small-world networks" *Nature* 393: 440-442, Jun. 4, 1998.
File History of U.S. Appl. No. 12/411,958.
English language abstract and translation of JP 2003-523030 published Jul. 29, 2003.
English language abstract and translation of JP 2001-229186 published Aug. 24, 2001.
English language abstract and translation of JP 2001-222613 published Aug. 17, 2001.
Office Action issued in AU 2013201826 dated Dec. 10, 2014.
Office Action issued in CA 2,662,939 dated Dec. 16, 2014.
File History of U.S. Appl. No. 12/791,320.
File History of U.S. Appl. No. 11/898,198.
File History of U.S. Appl. No. 13/777,124.
Office Action issued in CA 2,662,939 dated Oct. 14, 2015.
Office Action issued in CA 2,677,802 dated Sep. 19, 2016.
European Search Report issued in Application No. 08729660 dated Mar. 8, 2010.
Australian Office Action issued in Application No. 2008216368 dated Mar. 26, 2013.
Australian Office Action issued in Application No. 22014277794 dated Apr. 22, 2016.
Canadian Office Action issued in Application No. 2,677,802 dated Oct. 2, 2015.
Canadian Office Action issued in Application No. 2,677,802 dated Sep. 19, 2016.
Canadian Office Action issued in Application No. 2,677,802 dated Aug. 12, 2014.
Dion Hoe-Lian Goh et al., "Managing Geography Learning Objects Using Personalized Project Spaces in G-Portal", Research and Advanced Technology for Digital Libraries Lecture Notes in Computer Science; LNCS, pp. 336-343 (Jan. 1, 2005).
Ee-Peng Lim et al., "G-Portal: A Map-based Digital Library for Distributed Geospatial and Georeferenced Resources", Proceedings of the 2nd AMC/IEEE-CS Joint Conference on Digital Libraries, pp. 351-358 (Jul. 13, 2002).
Australian Search Report issues in Application No. 201702664 dated Dec. 7, 2017.
File History of U.S. Appl. No. 14/821,521.
European Search Report issued in Application No. 08729660 dated Dec. 1, 2017.
File History of U.S. Appl. No. 14/666,712.
File History of U.S. Appl. No. 15/723,698.

\* cited by examiner

Creating Action Driven Semantic Graph

Evolving the Semantic Graph by User Actions

FIGURE 6

Creates the Ability to Intelligently Serve Content

User searches on a term and
gets a result based on tags
and full text query then
weighted by degree and user
ratings:

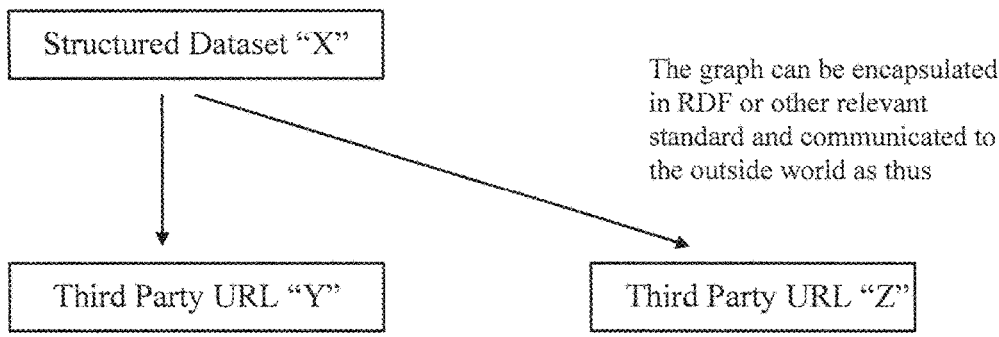

The graph can be encapsulated
in RDF or other relevant
standard and communicated to
the outside world as thus The system can now recommend data URL "Y" and "Z" as data
that may be useful context for dataset "X" even though they may
have no tags in common

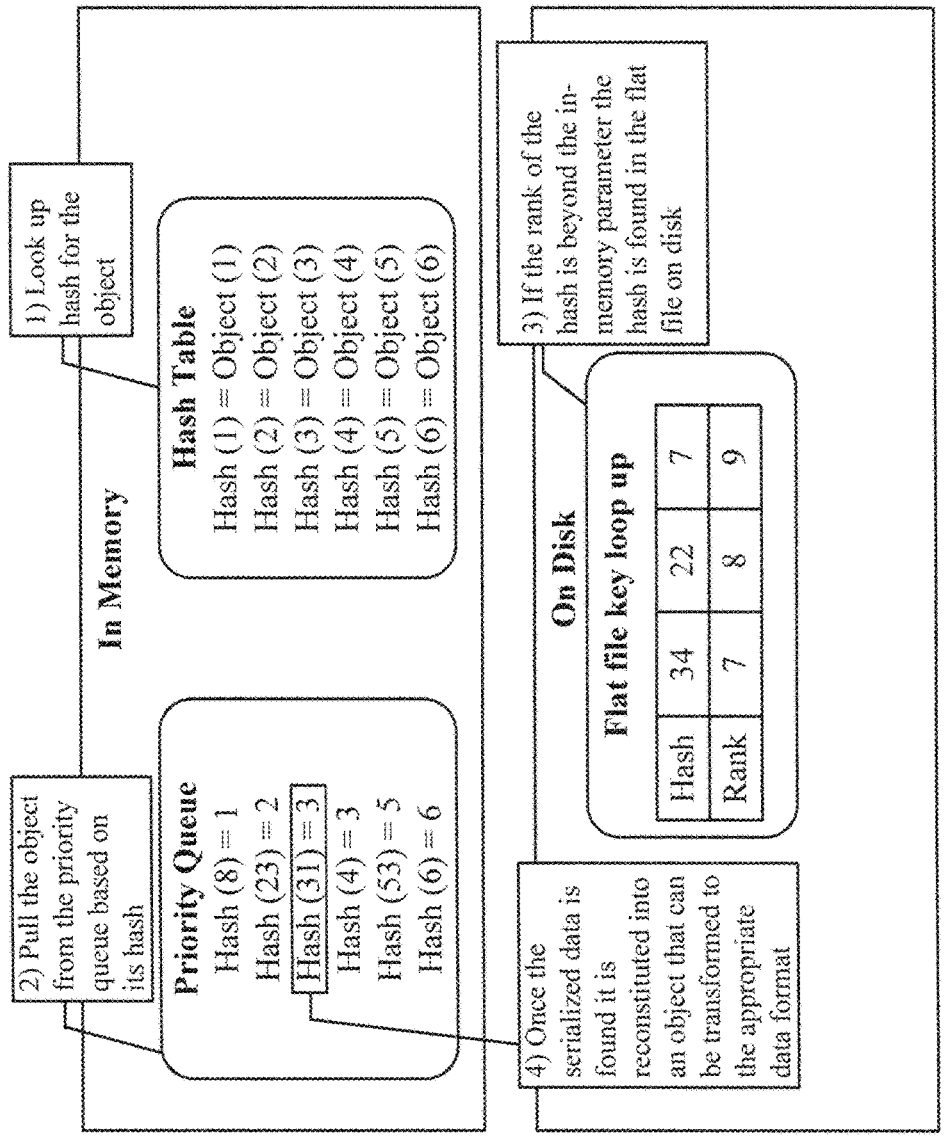

FIGURE 10

Finder! Open the World's Data.

geocommons toolset

SIGN IN: [____] [____] Go
New User? 30-second signup

Search for geographic data.
[____] Search

Now indexing 42 Billion points of public data

Browse by category, popularity, or your favorites
- Politics: 2008 Election | Republican | Democrat | Independent | More
- Earth: Hazards | World Health | Air Quality | Pollution | More
- Economy: Occupations | Imports and Exports | Technology | More
- Science: Lorem | Ipsum | Dolor Sit | Amet consectetuer | More
- Politics: 2008 Election | Republican | Democrat | Independent | More
- Earth: Hazards | World Health | Air Quality | Pollution | More
- Economy: Occupations | Imports and Exports | Technology | More

Store, Organize and Share your Geodata
Upload you geographic data and we'll make it easy to share it with the world in a variety of formats.

Upload a Spreadsheet or Upload a Shapefile

① Save your spreadsheet on CSV with Latitude and Longitude columns (learn how in our video tour)

② Select the CSV file to upload:
C:/myfiles/spreadsheet.csv  [Browse]

③ [Upload!]  We'll help you sign-in or sign-up (it's fast and free)

*Introducing Finder!*

About GeoCommons
Lorem ipsum dolor sit amet, consectetuer adipiscing elit, sed diam nonummy nibh euismod tincidunt ut laoreet dolore magna aliquam erat.
[Learn More]

1001

FIGURE 11 goFinder!
Open the World's Data.

* home
Your Library: Displaying all layers and favorites
Hide Favorites | video: Help with organizing

MAR 24

International Coffee: Production, Consumption, Exports, and Imports 2005   edit/delete
Tags: coffee project, international, coffee, exports, environment...
details ▼ uploaded by Kristen 3 months ago    [Download ▼]

Sales database import   edit/delete
Tags: coffee project, sales, import
details ▼ uploaded 2 hours ago  Not Shared (share)   [Download ▼]

Fair trade certified coffee shops   edit/delete
Tags: fair trade, coffee, exports, coffee project
details ▼ uploaded 2 hours ago  Shared (cancel sharing)   [Download ▼]

International Coffee: Production, Consumption, Exports, and Imports 2005   edit/delete
Tags: coffee project, international, coffee, exports, environment...
details ▼ uploaded by Kristen 3 months ago    [Download ▼]

MAR 22

Website visitors   edit/delete
Tags: coffee project, sales, import
details ▼ uploaded 2 hours ago  Not Shared (share)   [Download ▼]

Fair trade certified coffee shops   edit/delete
Tags: fair trade, coffee, exports, coffee project
details ▼ uploaded 2 hours ago  Shared (cancel sharing)

geocommons toolset
Welcome, Ned Alpacca  [Sign Out]

Tags (click a tag to filter this page)
View tags by: Frequency | Alphabetic        ⌐ 1101

| | | | |
|---|---|---|---|
| 30 International | 4 Dining |
| 29 Coffee | 4 Technology |
| 29 Exports | 3 Entrepreneurship |
| 19 Mapping | 3 Errors |
| 19 Visualization | 3 Extreme |
| 18 Environment | 3 Fashion |
| 15 Production | 3 Fiction |
| 12 Science | 3 Free |
| 10 Equality | 3 Freesharing |
| 9 Fair trade | 3 Filter |
| 9 Exploitation | 2 Flight |
| 8 Election | 2 Float |
| 7 Policies | 2 Font |
| 7 Markets | 2 Frames |
| 7 Foreign policy | 2 Ftp |
| 7 Import | 2 Geo |
| 7 Psychology | 1 Graffiti |
| 7 Aid | 1 Grammer |
| 6 Foreign aid | 1 Graphs |
| 6 Food | 1 Grayscreen |
| 6 Future | 1 Green |
| 6 Sales | 1 Grid |
| 6 Katrina | 1 Guitar |
| 6 Floods | 1 Helpful |
| 6 Life | 1 Hiring |
| 6 Green | 1 Home |
| 5 Green living | 1 Homepage |
| 5 Software | 1 Htaccess |
| 4 Culture | 1 Http |
| 4 Folksonomy | 1 Innovation |
| 4 Arts | 1 Interactive |
| | 1 Interview |

FIGURE 12 gcFinder!
Open the World's Data.

geocommons toolset
Welcome, Ned Alpaca   Sign Out

The Zen of Data Sharing bility. In this video our how to help others make s you share with the com- What should we name this data?: Location of every Whole Foods near DC Organize this with tags: whole foods, grocery, health, green, food
Hint: Click a tag below to add it.

Common tags: health, environment, politics, sports, science, technology

Add recently used tags: wine, grocery, starbucks, food, location, interesting, election, washington dc, favorite places, healthy living Who can see this data?   ○ only you   ● anyone Describe this data:

Where did you find this data?

Citation URL: Http://abed.mil.gov.net.com/24601
Paste the link here (if you have one).

Metadata URL: Http://abed.mil.gov.net.com/24601/xml/321
Improve our data integrity by providing a link to the formal metadata source for this data.

Save

FIGURE 13 geFinder!
*Open the World's Data.* geocommons toolset

Welcome, Ned Alpacca  [Sign Out]

Search results for...

| coffee | [Search] |

View your data ▲

☆ fave  International Coffee: Production, Consumption, Exports, and Imports 2005
details ▼  uploaded by Kristen  3 months ago    [Download ▼]

★ fave  Contains 70 points of data with 6 attributes:
Imports, Total Production, Consumption, Exports, Consumption Per Capita and Country ★ fave  Permanent Crops -- Percent of Land Area
details ▼  uploaded by Kristen  3 months ago    [Download ▼]

☆ fave  Starbucks Locations - Worldwide
details ▼  uploaded by Bill  2 days ago    [Download ▼]

☆ fave  San Antonio, Texas -- Coffee Shops and Cafes
details ▼  uploaded by Kristen  3 months ago    [Download ▼]

☆ fave  Starbucks Locations - Worldwide
details ▼  uploaded by Bill  2 days ago    [Download ▼]

☆ fave  International Coffee: Production, Consumption, Exports, and Imports 2005
details ▼  uploaded by Kristen  3 months ago    [Download ▼]

«Previous  1  2  3  4  5  6  7  8  9  10  ....  34  35  Next»

You have 45 favorites
Tip: use favorites to collect data for your project

Narrow Search by tags

Fair Trade
Exploitation
Production
Economy
Foreign Policy
Starbucks
Consumption
Exports

FIGURE 14 gcFinder!
Open the World's Data.

« Home   « Search Results   « Your Library

☆ fave

U.S. Certified Organic Other Crops Acreage by State 2005

Certified organic acreage of other crops, by State, 2005 including Cotton, Peanuts, Potatoes, Green Manure, Trees for Maple Syrup, and Fallow.

In addition to unclassified acreage, "other crops and land" acreage includes Christmas trees, tobacco, coffee, ginger, wheat grass, sprouts, vetch, clover, alfalfa and rye seed, shade and ornamental trees, Indian corn, sugar cane, CRP land, and wildlife habitat.

| ATTRIBUTE VALUE | DESCRIPTION |
|---|---|
| Cotton: | Certified Organic Cotton Acreage by State |
| AREA: | |
| Total: | Certified Organic Total Miscellaneous Crop Acreage by State |
| Potatoes: | Certified Organic Potato Acreage by State |
| Unclassified Crops | Certified Organic Unclassified / Other Crop Acreage by State -- in addition to unclassified acreage, "other crops and land" acreage includes Christmas trees, tobacco, coffee, ginger, wheat grass, sprouts, vetch, clover, alfalfa and rye seed, shade and ornamental trees, Indian corn, sugar cane, CRP land, and wildlife habitat. |
| Fallow: | Certified Organic Fallow Acreage by State |
| Trees for Maple Syrup: | Certified Organic Trees for Maple Syrup Acreage by State |
| Green Manure: | Certified Organic Green Manure Acreage by State |
| Peanuts: | Certified Organic Peanut Acreage by State |
| State: | State | geocommons toolset

Welcome, Ned Alpacca   [Sign Out]

[Download ▼]

Tags: (hints click to search)
USDA, farm, Organic, Certified Organic, acreage, cropland, Trees for Maple Syrup, Cotton, Peanuts, Potatoes, Fallow

51 rows   10 attributes

Uploaded by: Martin, January 12th, 2008
Citation: www.org.usda.gov...
Metadata: www.org.usda.gov...

[Copy and Edit]

Need to make a change to this information? Copy and Edit will make a copy of this page for you to edit and share.

Tip: Edited data pages won't appear in public search results, however feel free to share your edited data with friends and colleagues.

FIGURE 16

Maker! Map the World's Data

Username   Logout   [gc]   Search [ ] Go

Janet's Saved Maps

[ ] Find

My Maps | Make a Map

| Title | Description | Date | Overlays | Actions | | |
|---|---|---|---|---|---|---|
| The Story of Manifest Destiny | This map details the history of America's westward expansion... | 12/12/08 | 13 | Share | Edit | Delete |
| The Story of Manifest Destiny | This map details the history of America's westward expansion... | 12/12/08 | 13 | Share | Edit | Delete |
| The Story of Manifest Destiny | This map details the history of America's westward expansion... | 12/12/08 | 13 | Share | Edit | Delete |
| The Story of Manifest Destiny | This map details the history of America's westward expansion... | 12/12/08 | 13 | Share | Edit | Delete |
| The Story of Manifest Destiny | This map details the history of America's westward expansion... | 12/12/08 | 13 | Share | Edit | Delete |
| The Story of Manifest Destiny | This map details the history of America's westward expansion... | 12/12/08 | 13 | Share | Edit | Delete |
| The Story of Manifest Destiny | This map details the history of America's westward expansion... | 12/12/08 | 13 | Share | Edit | Delete |

We ♥ Feedback    About GeoCommons | Contact Us | Press | GeoCommons is owned and operated by Fortius One. © 2006

FIGURE 18

Atlas! Learn More
Tell the World's Stories.

Username Logout

[ Browse ] [ Search 🔍 ] [ Go ]

[ Top Stories ] [ My Atlas ]

Kayaker Dreaming: Paddle the Waves
12/2/08 Lorem ipsum dolor sit amet consectetuer adipiscing elit. Integer a est ut libero hendrerit aliquam. Lectus non dictum gravida, pede leo laoreet est, eu vehicula lorm velit in lacus... Read More

Kayaker Dreaming: Paddle the Waves
New Zealand
12/2/08 Lorem ipsum dolor sit amet consectetuer adipiscing elit. Integer a est ut libero hendrerit aliquam. Lectus non dictum gravida, pede leo laoreet est, eu vehicula lorm velit in lacus... Read More

Chinchilla Escapades
South America
12/2/08 Lorem ipsum dolor sit amet consectetuer adipiscing elit. Integer a est ut libero hendrerit aliquam. Lectus non dictum gravida, pede leo laoreet est, eu vehicula lorm velit in lacus... Read More

Kayaker Dreaming: Paddle the Waves
New Zealand
12/2/08 Lorem ipsum dolor sit amet consectetuer adipiscing elit. Integer a est ut libero hendrerit aliquam. Lectus non dictum gravida, pede leo laoreet est, eu vehicula lorm velit in lacus... Read More

Kayaker Dreaming: Paddle the Waves
12/2/08 Lorem ipsum dolor sit amet consectetuer adipiscing elit. Integer a est ut libero hendrerit aliquam. Lectus non dictum gravida, pede leo laoreet est, eu vehicula lorm velit in lacus... Read More

Kayaker Dreaming: Paddle the Waves
12/2/08 Lorem ipsum dolor sit amet consectetuer adipiscing elit. Integer a est ut libero hendrerit aliquam. Lectus non dictum gravida, pede leo laoreet est, eu vehicula lorm velit in lacus... Read More

Kayaker Dreaming: Paddle the Waves
12/2/08 Lorem ipsum dolor sit amet consectetuer adipiscing elit. Integer a est ut libero hendrerit aliquam. Lectus non dictum gravida, pede leo laoreet est, eu vehicula lorm velit in lacus... Read More

Kayaker Dreaming: Paddle the Waves
12/2/08 Lorem ipsum dolor sit amet consectetuer adipiscing elit. Integer a est ut libero hendrerit aliquam. Lectus non dictum gravida, pede leo laoreet est, eu vehicula lorm velit in lacus... Read More

Featured User Atlases
Sean Gorman
35 Atlas Stories
104 Maker Maps

Chris Marentis
35 Atlas Stories
104 Maker Maps

Dave Waldrup
35 Atlas Stories
104 Maker Maps

Atlas Live ❚❚ PAUSE
Live view of Stories being read.
Kayaker Dreaming: Paddle the Waves
12/2/08 Lorem ipsum dolor sit amet consectetuer adipiscing elit. Integer a est ut libero hendrerit aliquam. Lectus non dictum gravida, pede leo laoreet est, eu vehicula lorm velit in lacus... Read More

Kayaker Dreaming: Paddle the Waves
12/2/08 Lorem ipsum dolor sit amet consectetuer adipiscing elit. Integer a est ut libero hendrerit aliquam. Lectus non dictum gravida, pede leo laoreet est, eu vehicula lorm velit in lacus... Read More We ♥ Feedback | About GeoCommons | Contact Us | Press | GeoCommons is owned and operated by Fortius One. © 2006

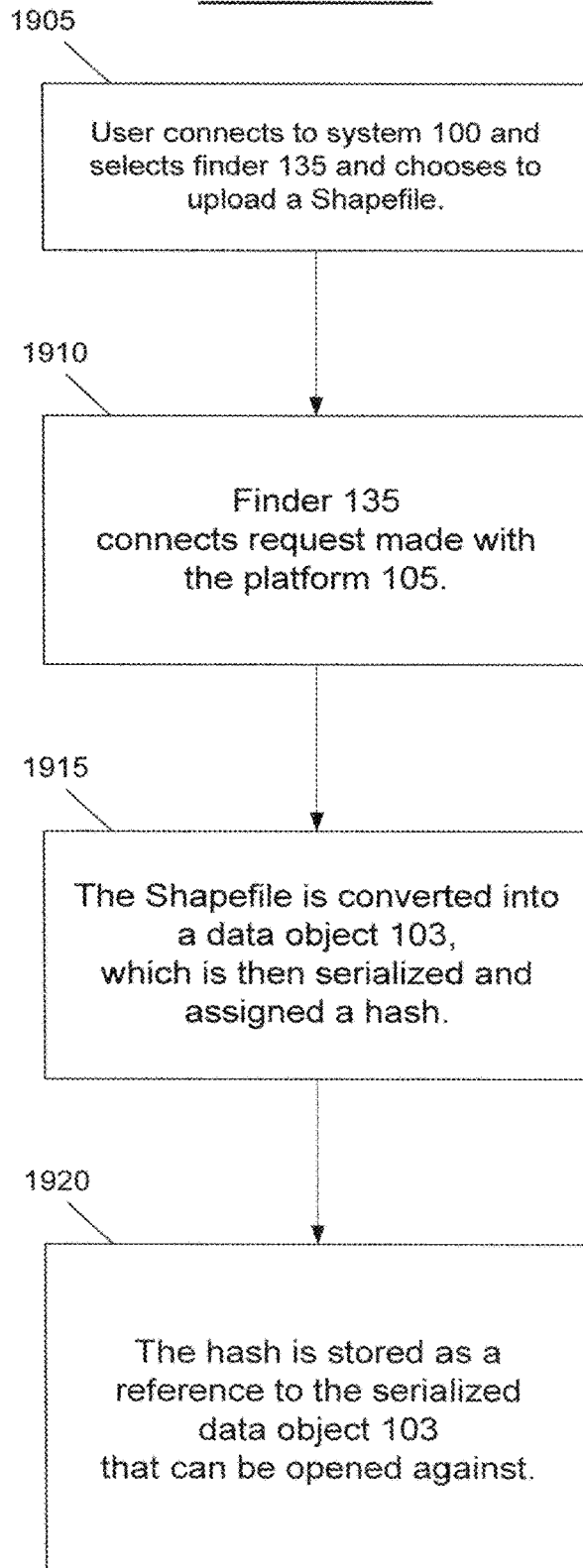

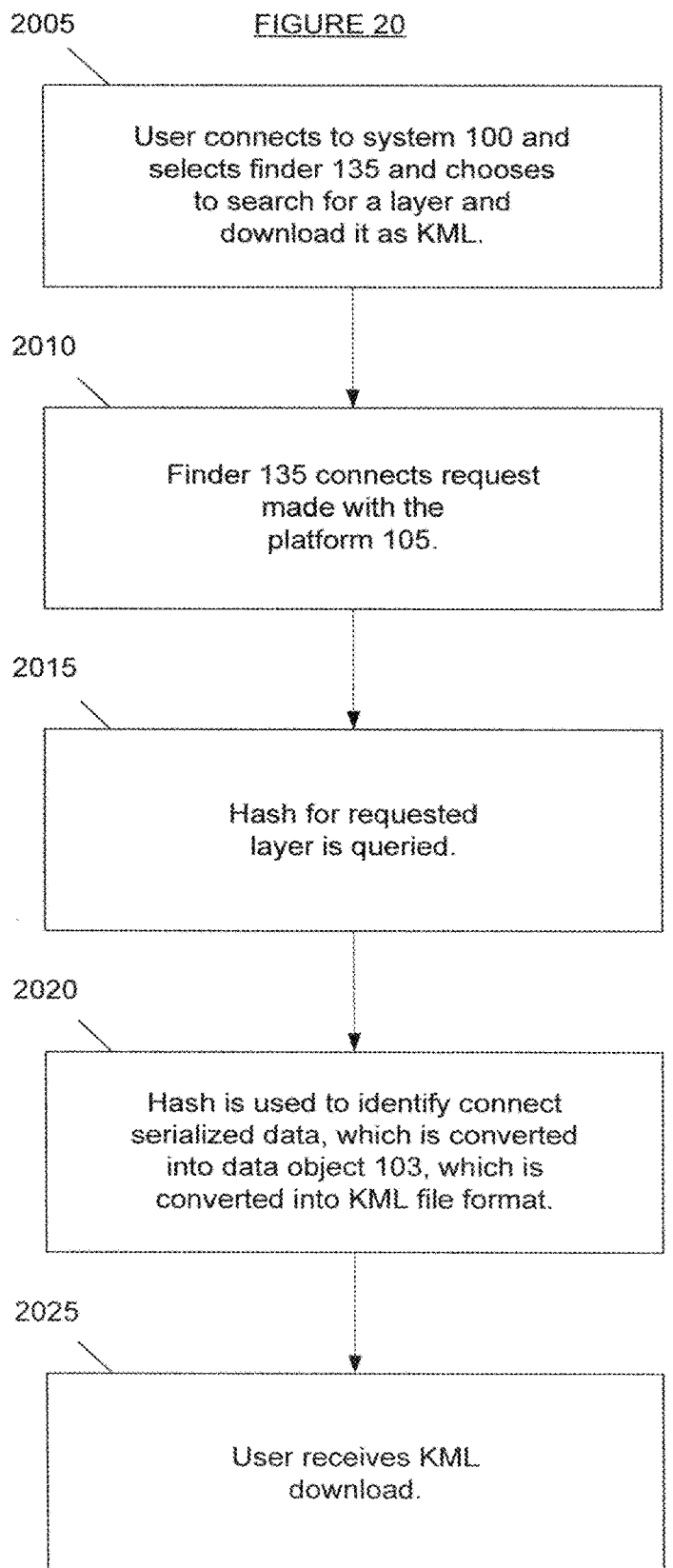

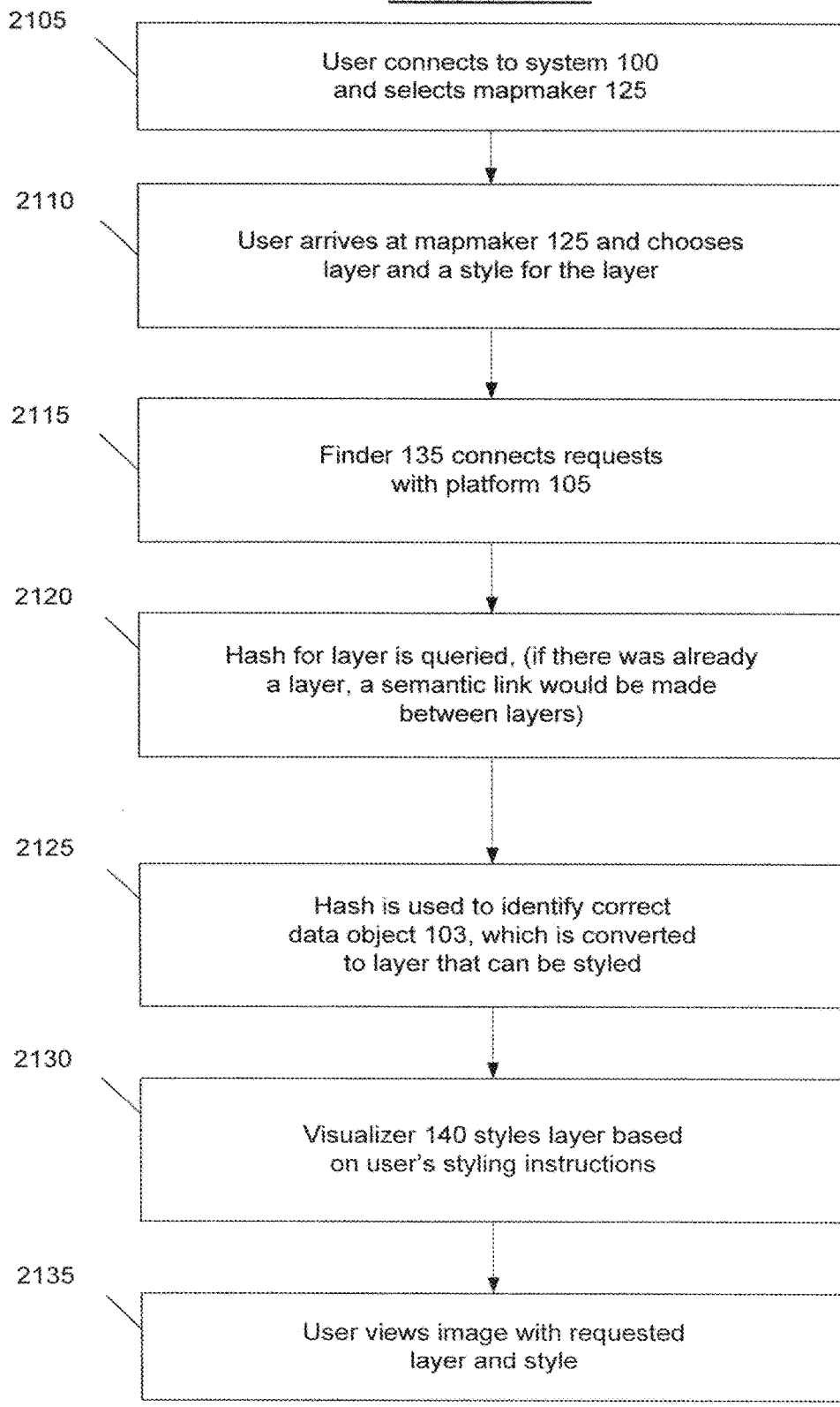

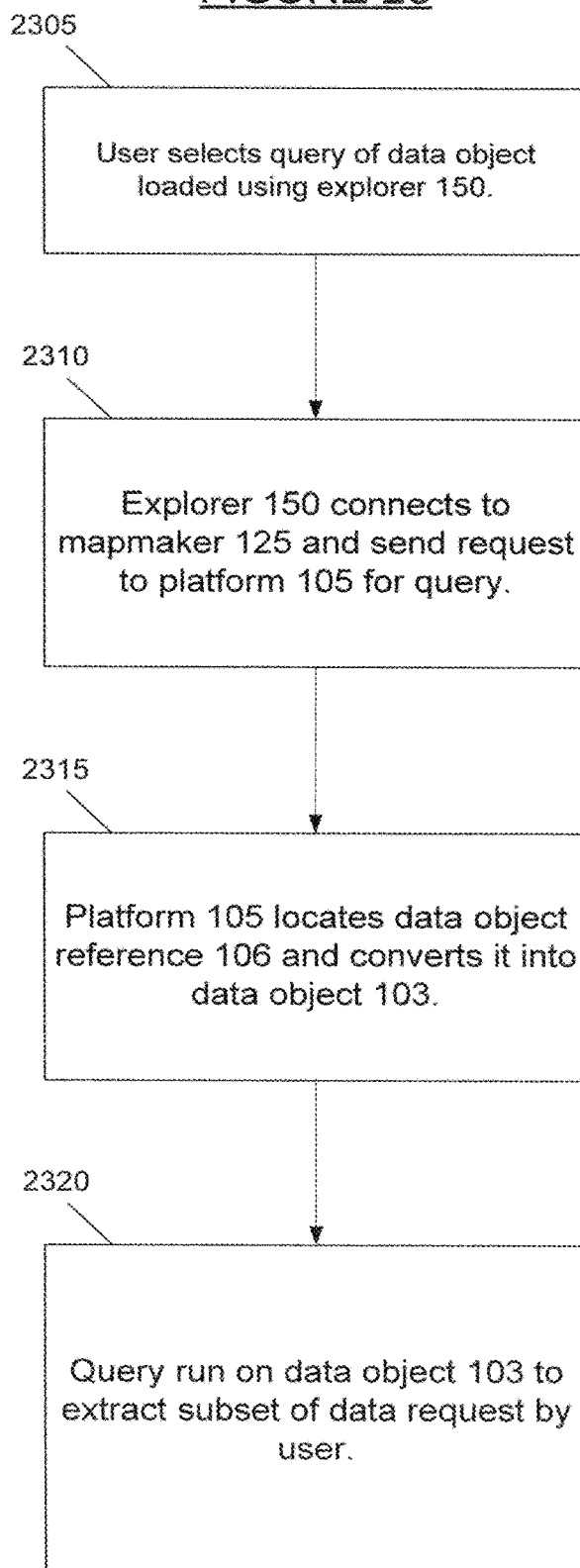

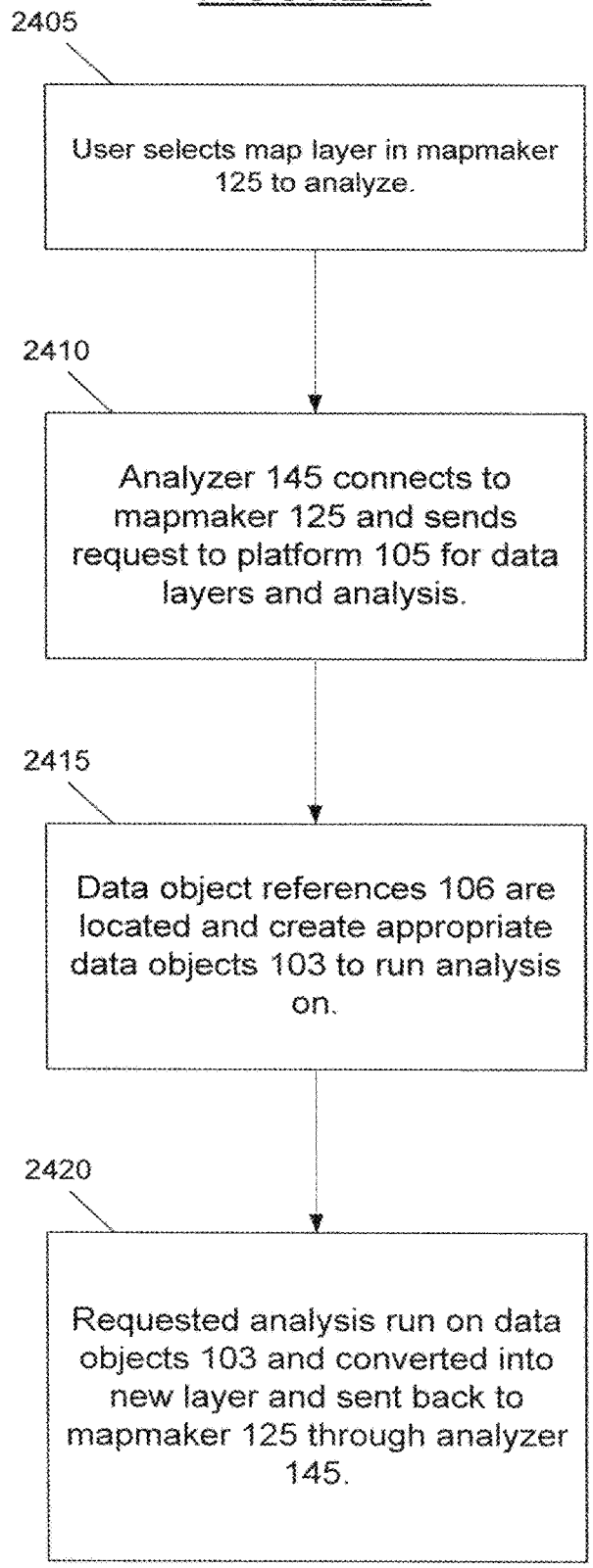

METHODS AND SYSTEMS FOR CONNECTING A SOCIAL NETWORK TO A GEOSPATIAL DATA REPOSITORY

This application claims priority to provisional application 60/889,608, entitled "Method and System for Integrating a Social Network and Data Repository to Enable Map Creation", filed on Feb. 13, 2007, which is herein incorporated by reference.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIGS. 2-7 and FIGS. 19-24 illustrate various work flows related to the system 100, according to several embodiments.

FIGS. 8-18 are screen shots illustrate the use of various tools 110 and applications 101, according to several embodiments.

DESCRIPTION OF EMBODIMENTS OF THE INVENTION

Figure 1:
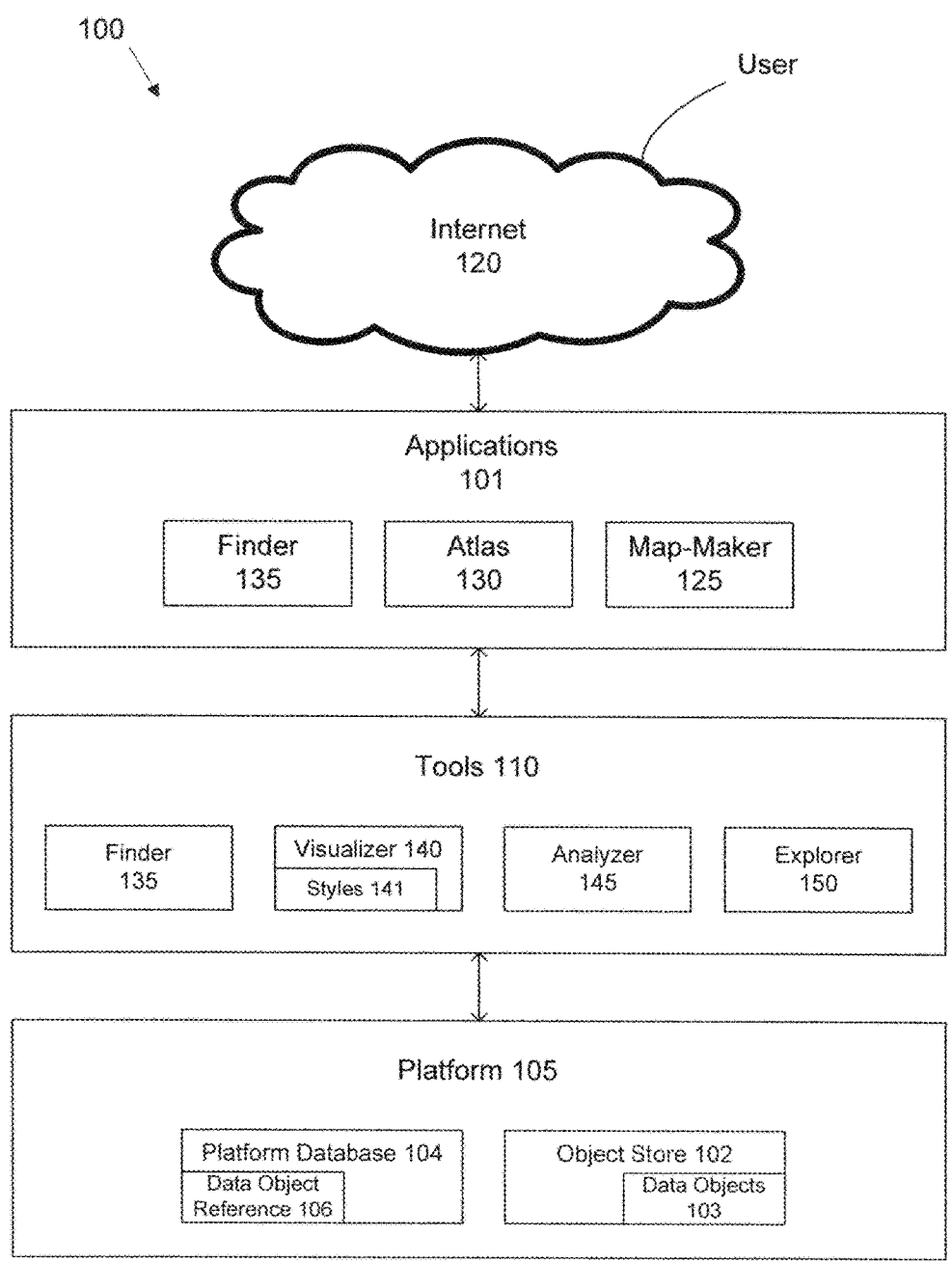
FIG. 1 illustrates a system 100 for integrating a social network and data repository to enable map creation, according to one embodiment.

FIG. 1 illustrates a system 100, which may include a computer with at least one processor, for integrating a social network and data repository to enable map creation, according to one embodiment. A scalable framework is provided to support a variety of web-enabled applications, according to one embodiment. The web-enabled applications can include, but are not limited to, Geographic Information Systems (GIS), mapping applications, cartographic applications, Computer Aided Design (CAD) applications, virtual globe applications, three dimensional environment applications, mirror world applications. FIG. 1 illustrates elements of the system, including the platform 105, the tools, 110, and the applications 101, as well as details about each of these elements, which are described below.

Platform

In one embodiment, a data object 103 is submitted in a variety of formats to a platform 105, which includes a platform database 104 and an object store 102. The platform 105, working with other elements of the system, allows users to easily share, consume, manage, and analyze data, as well as orchestrate it on a map. The platform 105 can comprise a platform database 104 and, in some embodiments, an object store 102. The platform 105 provides technology for managing data (e.g., geospatial data) including: searching for data, importing data, exporting data, creating metadata, commenting on data, annotating data, and/or rating data, as well as many other ways to interact with data.

Data Objects.

Data objects 103 are created from serialized data. The serialized data can include the underlying data that can create the large amounts of data required for the data object 103. In one embodiment, an object store 102 works with a platform database 104 in order to provide a fast and scalable approach for these large amounts of data (e.g., geographic information). Data object references 106 are identifiers for the serialized data stored in the object store 102, can be used to create the data objects 103. Data object references 106 can be stored in the platform database 104. Data object references 106 can include the hash (e.g., PQR1) that points to the serialized data in the object store 102 that creates the much larger data object 103. Thus, in one embodiment, none of the large data objects 103 need to be stored, as only the data object reference 106 that points to their serialized data needs to be stored. Various applications can be used to turn the serialized data into the much larger data objects 103, including, but not limited to, Ruby. JAVA, and C programming languages. The data object reference 106 can include or be stored with other metadata, such as the title of the corresponding data object (e.g., MAP OF NEW YORK APARTMENTS), the attributes (e.g., price, photo, description, number of rooms, etc.), tags associated with the corresponding data object (e.g., categories), and links to other related data objects (e.g., which can be created by users, as explained below when discussing semantic relationships). A layer uses one or more data objects 103 to present data. For example, a layer can be a layer on a map, a document such as a spreadsheet, or data from or in: a word processor, presentation software, a proprietary- or standards-based file format for Geographic Information Systems (GIS), a virtual globe software application, a web mapping application, a Computer Aided Design (CAD) application, a Global Positioning System (GPS) device, or a wireless, mobile or handheld device. For example, if the layer relates to a map, the data object 103 can be used to create a layer or many layers to go on top of the map. If the layer is a document such as or similar to a spreadsheet, one column could contain a shape and the remaining columns could describe that shape or a characteristic of the shape. For example, consider an application with Air Quality information for all of the United States zip codes. Each row in that layer would have a shape that defines a zip code followed by any number of columns that provide Air Quality information about that zip code. Layers can cover an innumerable number of different types of data including but not limited to demographics (income, race, gender, occupation, etc.), environment (pollution, geophysical, chemicals, etc.), politics (campaign contributions, votes, congressional districts, political boundaries, capitals, etc.), science (laboratories, exploratories, research funding, meteor strikes, etc.), retail (store locations, delivery routes, Automated Teller Machines (ATMs), kiosks, etc.), and transportations (roads, shipping lanes, bike routes, hiking trails, airports, etc.)

Data objects 103 can include, but are not limited to: a Shapefile (an Environmental Systems Research Institute proprietary file format Geographic Information System (GIS) software) file; a Keyhole Markup Language (KML)/Keyhole Markup Zip (KMZ) file; a GeoRSS (Real Simple Syndication with latitude/longitude components) file; a delimited text file (e.g., .txt files); and/or a user generated data file. The data objects 103 are managed through a tagging, rating and search technology that integrates data analysis capabilities in the system 100 and also in third party applications. This allows a single system to integrate and analyze data at single destination.

Data objects 103, such as geospatial data objects (i.e., data with coordinates that can be projected on the earth's surface, using, for example, xy, latitude/longitude, and/or military coordinates) can be originally stored and/or uploaded to the platform 105 from a third party application. Using the tools 110 (described in more detail below), the system allows non-technical users to quickly find geographic data and export it using standards that make it immediately usable with popular web mapping applications. Users can search for individual data objects 103 and common data themes based on tags and/or other identifiers in the data objects 103, as well as gather information on how the data objects 103 can be used to solve specific or additional problems. In addition to accessing data, users can upload geographic data they find and have it tagged and exported into easily usable formats. Users can share free open source data and also be able to sell proprietary geographic data.

A title for the data object 103 (e.g., New York Bars) can be provided, as can tags identifying the topics associated with the data object 103 (e.g., key words such as bars, New York). A description of the data object 103 (e.g., a summary) can also be provided, as can descriptions and titles for the attributes of the data object 103 (e.g., bar name, bar address, bar phone, rating of bar). This can be done through a manual and/or an automated process. Within this framework, a user can, for example, find geospatial data, create geospatial data, assemble maps from data, and/or share those maps in a collaborative multimedia environment.

The system 100 organizes and connects geospatial data in a networked community environment that runs in a web browser. The platform 105 can include data from government, the private sector, and/or academia.

The data object(s) 103 present in or uploaded into the platform 105 can be managed through a rating system, allowing a variety of metrics to be used to deliver the most relevant data object(s) 103 to the user after a user search using the finder tool 135. Each data object 103 can be rated (e.g., replacing the rating value or building up an average rating over time) to aid in organization and searching. In one embodiment, this allows data to be easily categorized without a strict, hierarchical system of pre-existing categories (although such constraints could be added at the application level if desired). Relevancy can be based on subject matter (e.g., how well the tags and identifiers meet the search criteria), popularity (e.g., how many times a certain data object 103 has been viewed or added to a map workspace), timeliness (e.g., how recently the data object 103 has been accessed), reputation (e.g., based on ratings), etc. Ratings can be included in a tabulation of the reputation of the user uploading the data object(s) 103, and such ratings will be driven by community feedback on the member. Community members can vote a user and data object(s) 103 trustable or not, and such ratings can provide metrics to drive search results for the most relevant geospatial data.

The ratings can be used as a quick measure of the quality or relevance of a data object 103, such that data objects 103 rated higher will appear ahead of lower-ranked data objects 103, allowing the users to build up a reputation for a data object 103 through repeated use. For example, a data object 103 containing information on electric transmission lines might be tagged with "Electricity," "Transmission," and "Power". If another data object 103 is added later with information on electric substations, it might be tagged with "Electricity" and "Substation". This allows a simple query to find all data objects 103 tagged with "Electricity," which would return the two sets mentioned previously. If more data objects 103 are added in the future with the same tags, the data objects 103 with higher ratings would appear higher in the search result list.

The system 100 can also direct users to suggested controlled vocabularies to allow consistency in the tagging of related information. For example, the system 100 can define a set of tags that are common and frequently used. When a user starts to type a tag the system looks for words already in the database that are similar and suggests this tag as an auto complete of what is being typed. The system also will provide a list of related tags that are common based on the most recently entered tag.

The data dictionary builder provides an interface through which users can modify the often hard-to-comprehend attributes associated with data objects 103, and to add useful descriptions for those attributes that provide additional value to users of the data objects 103, allowing them to more easily generate useful analytics from said data objects 103.

Users can also dynamically annotate a data object 103 or a collection of data objects 103 in a wiki style commentary; tag the data object(s) 103 with an automated data dictionary creator, and/or ingest the data object(s) 103 into the community for use, comment, and integration with other community data objects 103. For example, users can click on a location on a map and add their own information (e.g., photos, video, text, hyperlink). This user generated data is then associated with data objects on the map tagging the user with an association for future search.

With "wiki formatting," simple markup and hypertext capabilities are embedded into arbitrary, user-generated content without needing to know HTML. In one embodiment, wikis for the data objects 103 are modifiable by any user, allowing anyone with information to add to do so and contribute to the annotation. In another embodiment, this can be allowed only for certain users, and can be changed at the application security layer.

Data ingest in the platform 105 allows a variety of file formats, including but not limited to: a Shapefile format (a proprietary file format for ESRI ArcGIS), a JavaScript Object Notation (with latitude and longitude coordinates embedded) (GeoJSON) format, a Global Position Data Transfer (GPX) format, a Geographic Markup Language (GML) format, a Topologically Integrated Geographic Encoding and Referencing system (TIGER) format, Postgres Structured Query Language for Geographic Information Systems (PostGIS) format, an Oracle Spatial format, a Geographic Resources Analysis Support System (GRASS) format, and/or a Really Simple Syndication (with latitude and longitude coordinates embedded) (GeoRSS) format, a Keyhole Markup Language (KML) format, a Comma Separated Value (CSV) format, a Web Feature Service (WFS) format, and/or an OpenGIS Simple Features Reference Implementation (OGR) format. The data in the various formats can be converted into one common format and ingested directly into a data object 103 (e.g., which can form a map layer). To convert the data, the system can use appropriate software to read the file format and extract data. In one embodiment, once the file format has been read and data extracted, is the data can be converted into a common format and turned into a data object that can be manipulated by the system. Once the file format has been converted to a data object 103, the data objects 103 are all in a common format with no functional differences regardless of the original file format.

The data objects 103 are then serialized using conventional tools, such as found in Ruby, lava, or C, and can be stored in the object store 102. When a data object 103 is requested, the data object reference 106 for that data object 103 points to the serialized data in the object store 102. The serialized data is then converted back into a data object 103 using Ruby, Java, C, etc. The data object 103 can be used, for example, as a map layer. All the data objects 103 that come out of the data store 102 can be in the same format, and thus, in one embodiment, there isn't an issue in dealing with map layers of different file formats. Data ingested into a data object 103 can allow high speed imports. Metadata can be collected during the ingest process including, but not limited to, information such as the number of attributes, columns, rows, projection, user identity and time of ingest of the data object 103. Data objects 103 that are imported can be previewed in either a tabular view of the data object(s) 103 or a map view (i.e., as a layer or layers of a map) of the data object(s) 103 or both. The data object(s) 103 can be exported from the system in many file formats including those listed above.

The system also has the ability to ingest user generated data objects 103 to a map and associate it with existing spatial data objects. User generated data objects 103 can take the form of text, hyperlinks, photos, or video and the system will allow the user to click on the location that is associated with the information and have latitude and longitude be tagged to the data object(s) 103 as well as the data object(s) already on the map that the user is associating their data object(s) 103 with. Therefore when data is searched, a user can not only get the results of the original spatial data object 103 (e.g., a layer or layers on a map) but also the user generated data tagged to it. Any of the data objects 103 in the system can be added to a browser based mapping application. Any search result can be dragged onto the map and displayed and analyzed. A variety of analysis tools can then be run against the data object(s) 103.

Thus, the system 100 can utilize social networking through user driven actions to build relationships and connections based on user preferences and behavior profiling. Locating data, sharing expertise, experience, and related knowledge enables users to create connections with other users (i.e., other members). The social interaction of users creating maps and derivatives of maps utilizing data objects 103 allows the system 100 to create semantic relationships between disparate data objects 103 located in the platform 105 and in third party applications. As mentioned above, the data object reference 106 can include or be associated with semantic information. For example, if a user creates a map with the following layers—New York apartments, New York bars, New York crime rates, New York museums—a semantic relationship could be created linking all of these layers or data objects 103 together because they have been used on the same map together, which can be accomplished by a user action. Once two data objects 103 have been placed on the same map and there is a semantic link between them, this semantic information is stored in the metadata included or associated with the data object reference 106. This Semantic information can be stored in many formats: a graph, edge list, node link list, etc. If stored as a graph, the semantic information would indicate that the New York apartments data object is linked to the New York bars object, the New York crime rates object, and the New York museums object. As another example, if a user creates a map with housing prices and crime rates, then there is a semantic relationship between those two layers even if they do not share any related tags. These relationships are not limited to data objects 103. For example, if a page has a map of housing prices and crime rates (created from data object A), and a user has added photos of houses and crime scenes (created from data object B) then these data objects A and B have an association with each other. These associations between data objects 103 can be stored as a graph in the system (for example, see FIGS. 4-6, which illustrate the semantic relationship and are explained in detail below). If a semantic relationship based on use has been established between data object A and B, then a link on a graph between data object (node) A and data object (node) B can be stored as the semantic information. This graph can then be leveraged to recommend data objects 103 that are related to each other when users are searching. For example, if a user selects the housing price data object 103, the system can recommend the crime and photos data object 103 as other data objects 103 that could be useful. Thus, for example, if a user has selected a data object 103 to place on a map, the system can search the graph to see what other data objects 103 have been put on maps with that data set by other users in the past. The more times a data object 103 has been put on a map, the more links it would have to other data objects 103, and it would thus have a higher likelihood that it is a data object 103 worth recommending to a user.

Figure 2:
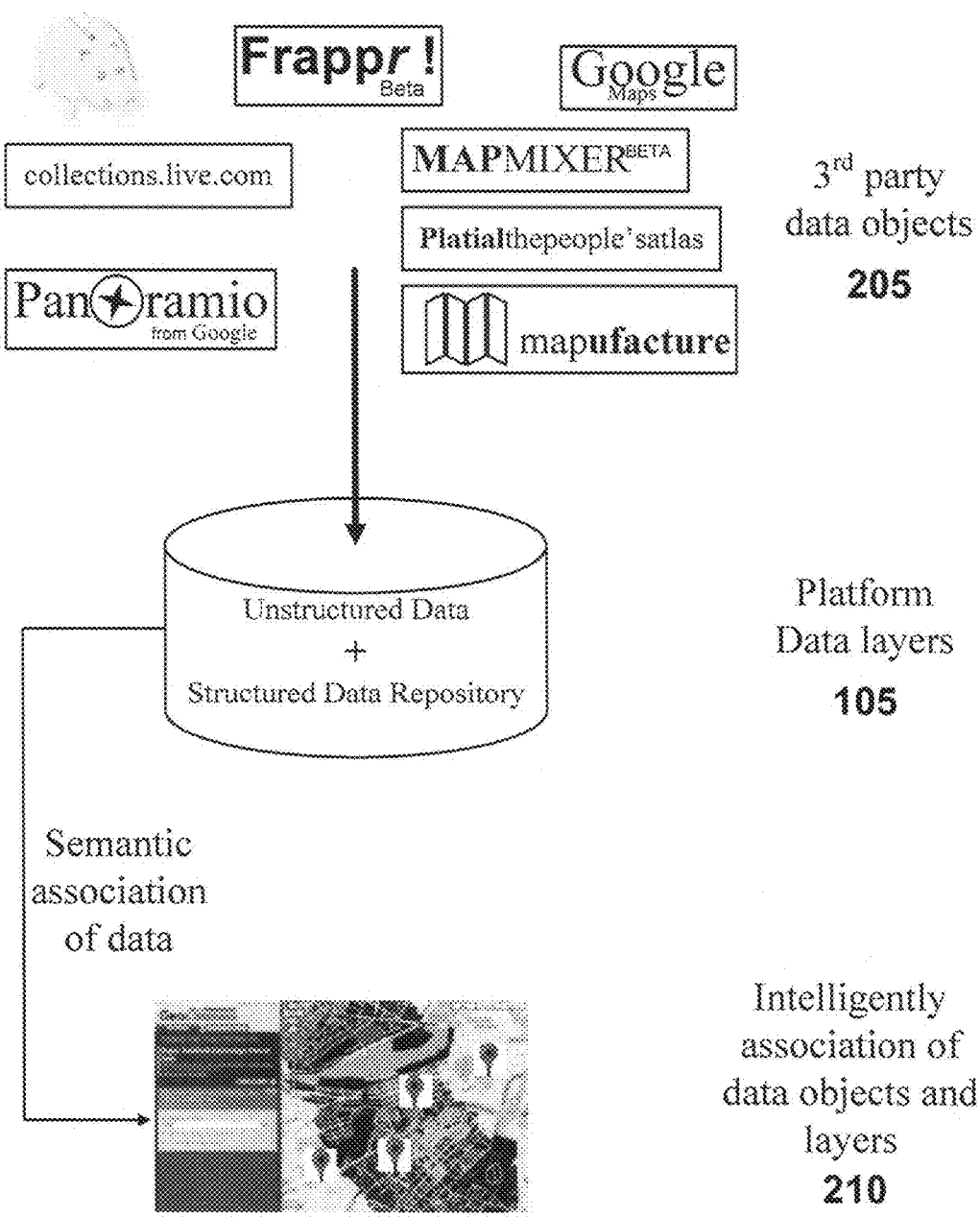

FIGS. 2-6 illustrate various work flows for creating action driven semantic relationships in the system 100, according to several embodiments. FIG. 2 provides a high level look of connecting the platform 105 to third party data objects 205 as reverences. FIG. 2 also illustrates associating those third party data objects 205 with map layers 210 whose data objects are stored in the platform 105.

Figure 3:
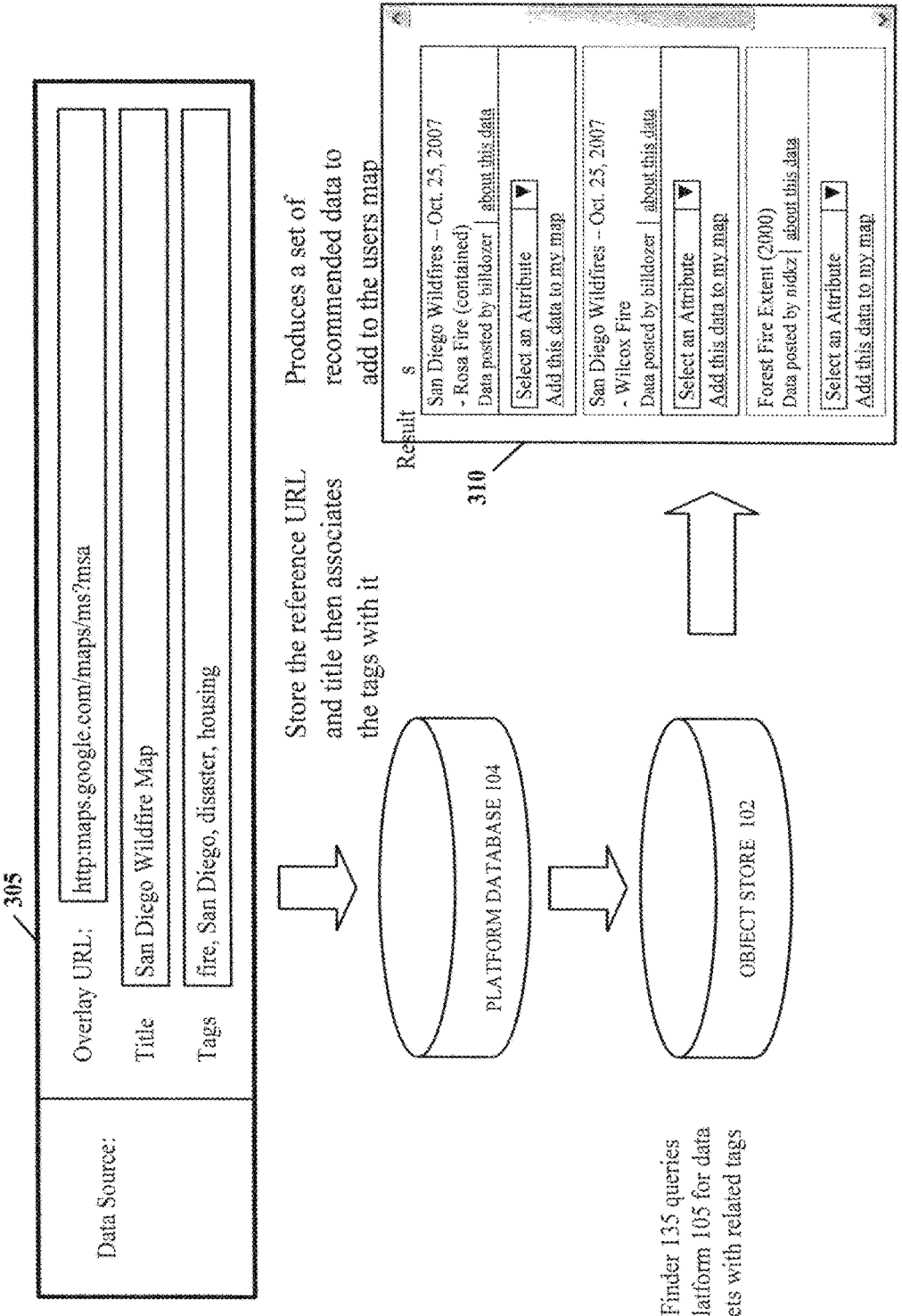

FIG. 3 illustrates a process of connecting third party data objects through URL, references, and then tagging the third party data objects to layers in the platform 105. 305 illustrates third party data objects. Reference URLs to these third party data objects, along with their titles and associated tags, are stored in the platform database 104. The platform database 104 then queries the object store 102 for data objects with related tags, and produces a set of recommended data objects 310 to add to the user's map.

Figure 4:
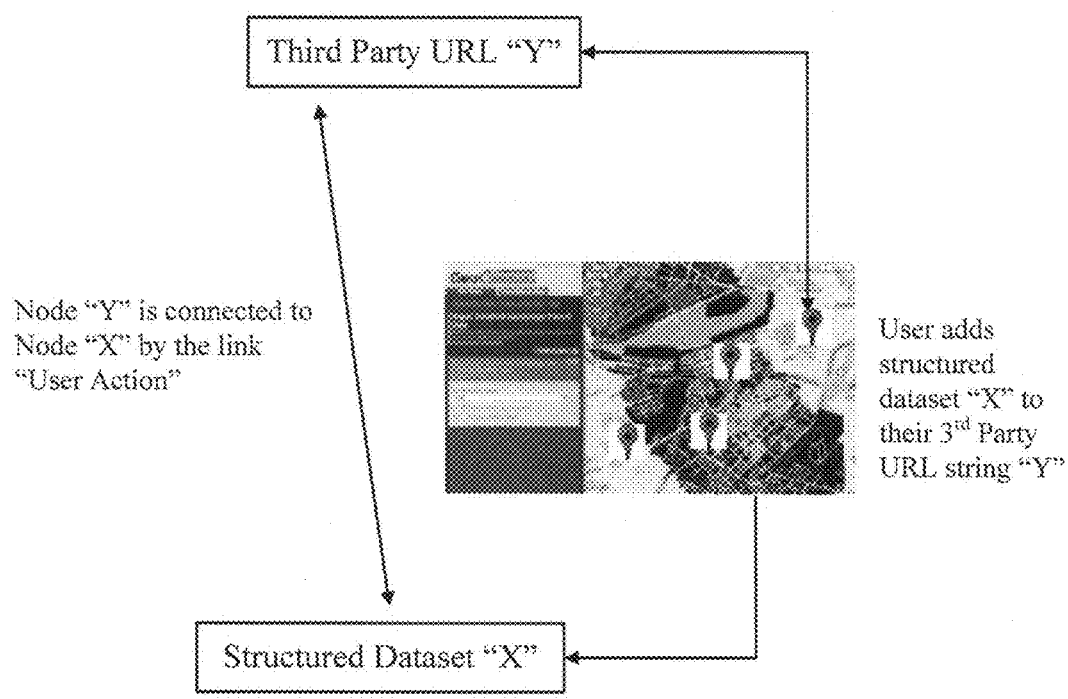

FIG. 4 illustrates how semantic relationships beyond tags can be built based on user actions. When a user places two data objects (such as a third party URL "Y" and a structured data object "X") on the map or atlas page, then a relationship can be assigned to the two or more objects. This relationship can be constructed as a graph where the data objects are nodes X and Y and an action driven relationship between them is a link.

Figure 5:
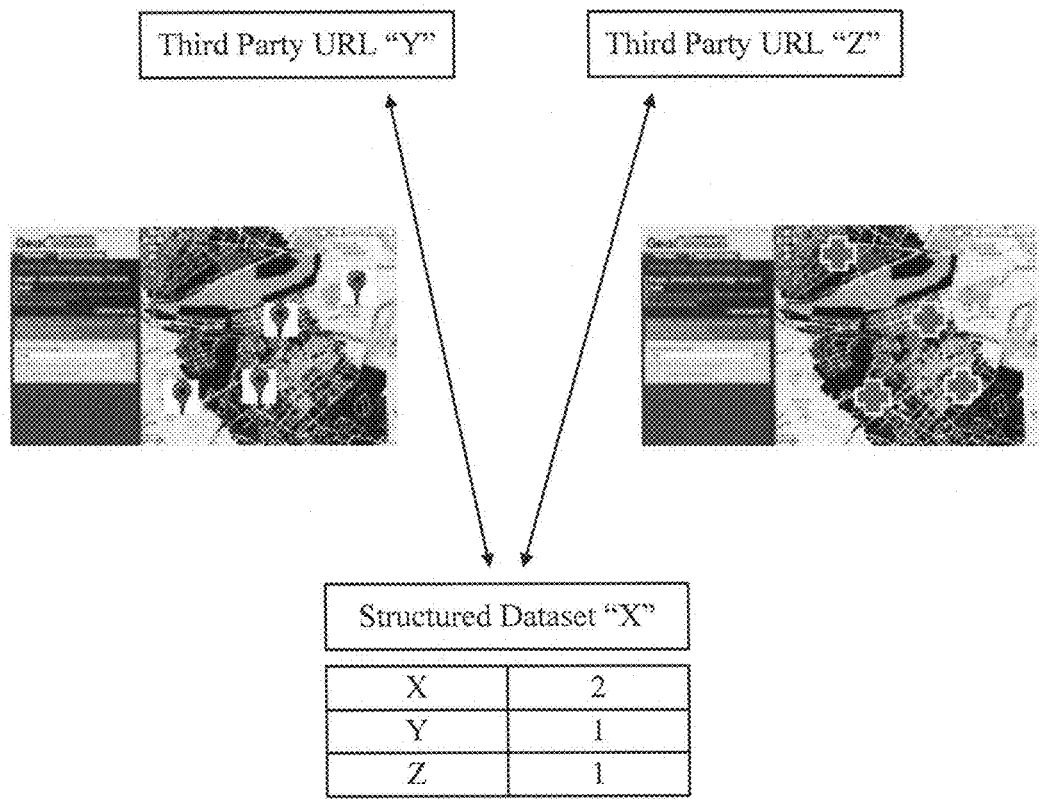

FIG. 5 illustrates how one metric for the utility of a data object can be the number of other data objects it is associated with. This graph can also be leveraged to recommend data objects that have a high degree of connectivity. In FIG. 5, X is a structured data object located on the platform 105, and Y and Z are references to third party data objects hosted elsewhere on the Internet. (Note that, in one embodiment, the third party data objects are not converted into the system's data objects 103, but are recreated using outside sources (e.g., URLs to other sources will create the third party data objects.) Because these data sets were put on the same map utilizing the system 100, the system 100 connects them together in a connectivity graph with data objects X, Y, and Z as nodes that are linked together when they are placed on the same map together. Thus, the metadata stored with the data object reference 106 can indicate semantic relationships with both data objects 103 created by the system, as well as third party data objects created outside the system.

FIG. 6 illustrates a method by which to intelligently associate and recommend content. A user searches on a term and gets a result (data object "X") based on tags and full text query then weighted by degree and user ratings. The system can now recommend data URL "Y" and "Z" as data that may be useful context for data object "X" even though they may have no tags in common. The graph can be encapsulated in RDF or other relevant standard and communicated to the outside world as such.

The object store 102 can be easily distributed to communicate over the Internet (e.g., using TCP/IP) and can be configured to reside on a commodity server. Data objects 103 in the object store 102 can be original to the platform database 104 or be federated from third party databases connected through the Internet (e.g., by HTTP) to the platform database 104.

In one embodiment, the social relationships of a user start forming, as soon as a user registers to become a member. The member has places where relationships can be connected, including the following:

Member Profile (Profile Viewed by the Account Owner)
    Profile information display
    Preferences (user setting tags/themes)
    Auto profiling
    Favorites (data object profiles, workspace profiles, members profiles)
    Members uploaded files (shared, not shared|creating Data object Profile)
    Workspace on system: Title and Description
    Messaging: (Mailbox, Wallboard (comments))

Behaviors/Functions of the Member: (where the Member is not the Owner of a Data Object)

Viewing a Data Object Profile
    Visiting a data object (actions that flags a tag preference/georank)
    Adding the data object to the auto profiling (actions that flags a tag preference/georank)
    Downloading data object (actions that flags a georank)
    Editing/Contributing knowledge/Information to the data object (notifies poster/others who have bookmarked)
    Adding a comment/Question (notifies poster/others who have bookmarked)
    Viewing a list of contributors/bookmarkers Member Profile (Profile Viewed by Other Users)
    Visiting a member profile (actions that flags a georank)
    Adding the member to the auto profiling (actions that flags a preference)
    Messaging a member
    Adding a comment/Question Member Workspaces:
    Visiting a members workspace (actions that flags workspace tags/georank)
    Adding the workspace to the auto profiling (actions that flags a preference)
    Adding a comment/question (flags workspace owner and others who have bookmarked the page)

Platform Database and Object Store.

As mentioned above, the object store 102 works with the platform database 104 in order to provide a fast and scalable approach for storing large pieces of information (e.g., geographic information). (Note that, in one embodiment, the platform database 104 and the object store 102 can be combined in one database. In another embodiment, they can be two different databases.) In one embodiment, data object references 106, which are identifiers for the much larger data objects 103 stored in the object store 102, can be stored in the platform database 104. Scalability bottlenecks can be removed by storing the data objects 103 (using Ruby, lava, C, etc.) in a format that is easy for an application 101 to consume. The data objects 103 are managed in an object store 102 as serialized data that can be turned into data objects 103 that are referenced by hashes that serve as a key (the data object reference 106) to identify each data objects 103. The data is denormalized in this process to allow fast in-memory transformations. Then the platform database 104 only needs to store the data object references 106 to the data objects 103 as hashes resulting in a very low load on the platform database 104.

FIG. 7 summarizes a work flow for finding an object in the object store 102 and delivering it out of the object store 102 to a user, according to one embodiment. In 1, the hash (or data object reference 106) for the data object 103 is looked up in the platform database 104. In 2, the data object 103 is pulled from a priority queue (described in more detail below) based on its hash value if the data object 103 is in the priority queue. The priority queue is in memory, rather than on a disk, making it quicker to access. In 3, if the rank of the hash in the priority queue is beyond the in-memory parameter (e.g., if the platform 105 has one gigabyte of memory and the queue exceeds one gigabyte of memory), then the data object reference 106 at the bottom of the queue is moved to disk and out of memory, and the hash is used to search for the data object 103 in that another place (e.g., the flat file on the disk). In 4, once the serialized data corresponding to the hash (or data object reference 106) is found, it is reconstituted into an object (using Ruby, Java, C, etc.) that can be transformed into an appropriate data format. As indicated above, because all the data objects 103 that are created from the serialized data in the data store 102 are in the same format, different file formats do not need to be addressed. Similarly, once serialized data is converted to a data object 103, the data object 103 can then be turned into another format for export by the system, and that file format does not have to be the native file format the data object was originally uploaded in. This allows users to export data from the system in a file format that is useful for whatever application they are using outside of the system. This also enables the platform to be part of a large number of different technology work flows.

When a data object 103 is added to the system 100 it is ingested to the object store 102. In the ingest process, the data object 103 is brought in as an object (Ruby, Java, Python or other relevant language) and serialized. In its serialized form, the data object 103 can be strings, binary numbers, or any other relevant data in a serialized format. The data object 103 containing the serialized data is then assigned a data object reference 106 (e.g., a hash). A hash is a reproducible method of turning data into a (relatively) small number that may serve as a digital "fingerprint" of the data object 103. The hash allows two data objects 103 to easily be identified as the same or different. As shown in FIG. 7, the data object 103 and its assigned hash are then placed in a hash table within the object store 102. The hash table is kept in memory as a priority queue. A priority queue is an abstract data type to efficiently support finding data objects 103 with the highest priority across a series of operations. The operations include: insert, find-minimum (or maximum), and delete-minimum (or maximum). The priority queue can be of variable size depending on the parameters for the system implementation. Once the size has been set, data objects 103 that are pushed down the priority queue past the parameter can be moved to a flat file kept on disk in the system. This keeps the most frequently used data objects 103 in the object store 102 in memory and less frequently used data objects 103 on a disk or in another location.

The system 100 can then retrieve the serialized data to create a data object 103 based on its data object reference (hash) 106 from either the memory or the disk. The system can add an object to the object store 102 and return the hash of the object as a retrieval key. The system can then look up the serialized data for the data object 103 in the object store 102 based on its hash. This method returns a data object 103 that the system can then reconstitute in the appropriate data format for consumption. For example, when using the finder tool/application 135 (discussed in more detail below), if a user requested to export a data object 103 (e.g., a layer or layers of a map) as a Shapefile, a search would be done in the object store 102 based on the data object reference (hash) 106. The serialized data would be found and the data object 103 would be reconstituted and the platform would convert that data object 103 into a Shapefile that could be downloaded by the user. When using the mapmaker application 125 (discussed in more detail below), a user would request a data object 103 (e.g., from which a layer or layers of a map could be created) and the same process would happen except after the data object 103 was reconstituted it would be converted into a styled layer based on the user's direction (e.g., blue graduated circles for a city population layer). When using the atlas application 130 (described in more detail below), the same process would happen yet again except that the user may decide to convey the reconstituted data object 103 as a data table or chart instead of a map and add that to the atlas application 130 as additional context to the map.

Tools

Figure 8:
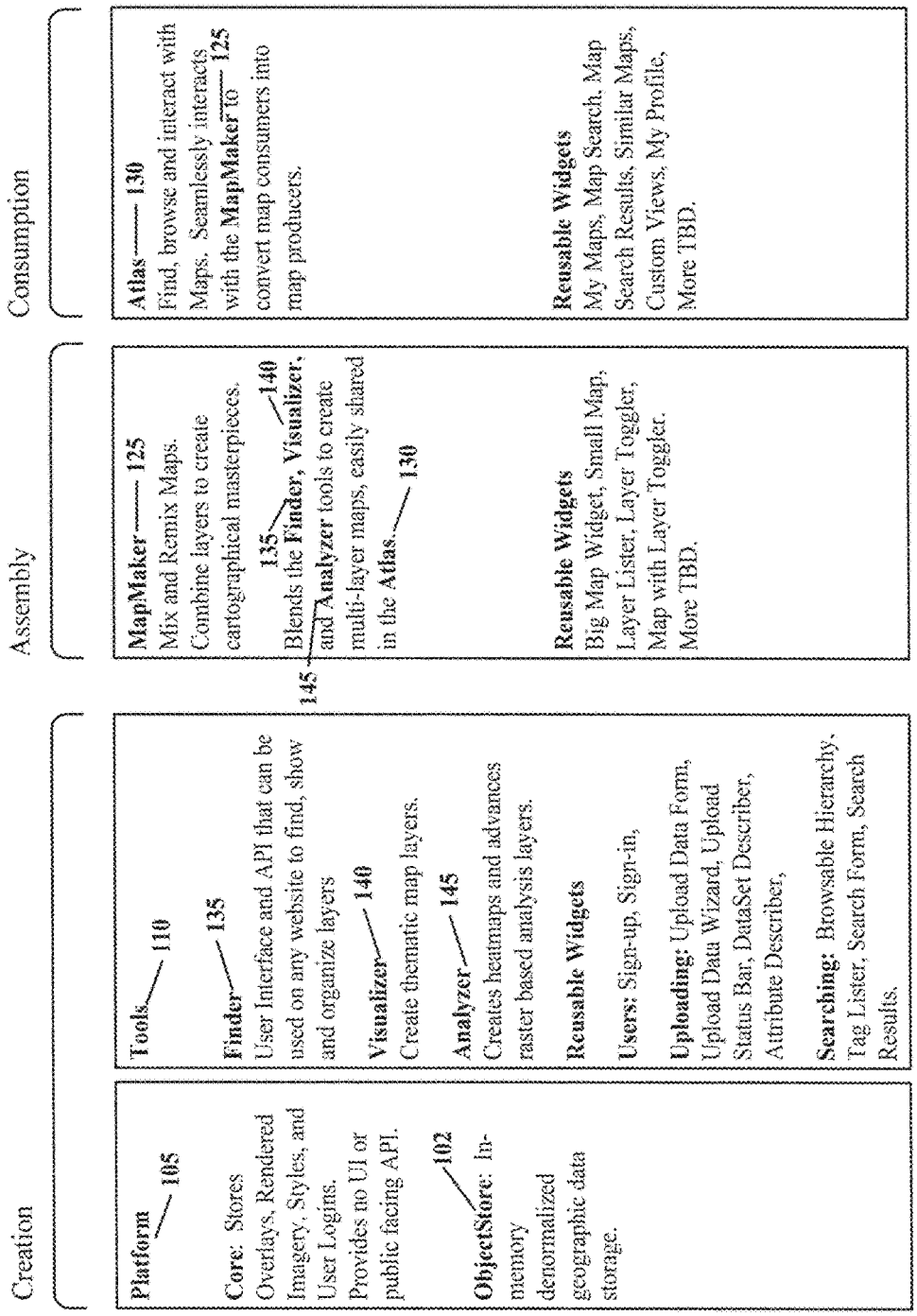

FIG. 8 illustrates the use of various tools 110 and applications 101, according to several embodiments. Tools 110 work with the platform database 104 (and, in some embodiments, the object store 102) when using the applications 101. Tools 120 can include application programming interfaces (API) and web embeddable components (widgets) and can serve the functions set forth below.

The finder tool 135 can be a sub-system for finding and creating data objects 103 (which in geospatial applications can be used to generate a layer or multiple layers of a map) through the platform 105. The finder tool 135 can find, share, organize and retrieve data objects. A data object 103 so "found" by the finder tool 135 can be referred to as a web-based overlay. The finder tool 135 can be a user interface and API that can be used on any website that accesses the data objects 103. (See FIG. 8.) Note that the finder tool 135 can also be used as a finder application 135 that can serve as an end-user destination for finding, organizing, creating, and sharing, geospatial data in common formats. Finder 135 can create data objects 103 (e.g., layers) through import functions, export data objects 103 (e.g., layers) to third party applications, and manage a user's set of data objects 103 (e.g., layers).

The visualizer tool 140 can be a sub-system for creating and/or selecting styles to visualize data layers (color, size, and/or shape). The visualizer tool 140 can include a styles component 141 which can make data objects 103 useful to an end user because of the ability to style the data objects 103 in a manner that conveys information. This stylized data object can also be referred to as a thematic overlay. (See FIG. 8.) The platform 105 approaches this solution through Style Layer Descriptions (SLDs) which contain a set of instructions that allow a system to assign color, size and/or shape to the geometries in a data object 103. Those colors, sizes and/or shapes can be set by a user or determined by the values assigned to the geometry. For instance, a set of points for cities could be given a size based on the amount of population in the city. Four sizes could be proscribed and the set of cities portioned into quartiles, with each quartile assigned to a different sized circle. The SLD can leverage standards such as, but not limited to, the Open Geospatial Consortium's (OGC) SLD format. By combining an SLD file (stored in the platform 105), with a data object 103 that the system can generate overlays graphical representations of data objects 103 stored in the platform.

The analyzer tool 145 can be a sub-system for creating and running vector and raster algorithms on data layers. The analyzer tool supports analytics built with the application as well as third party analytics as analysis data objects, which can be combined with other data objects in the platform 105. For example, the analyzer tool 145 can create heatmaps and advanced raster based analysis data objects. For details related to the heatmaps and advanced raster based analysis, see U.S. patent application Ser. No. 11/898,198, entitled "System and Method for Web-enable Geo-Analytics and Image Processing", filed on Sep. 10, 2007 and its priority document, U.S. Provisional Application 60/824,913, entitled "System and Method for Web-enable Geo-Analytics and Image Processing", filed on Sep. 8, 2006 (which are both herein incorporated by reference).

The explorer tool 150 can be a sub-system for viewing and editing of the tabular data in data objects 103, which, for example, allows users to explore the data behind a map. This can enable the exploration of numbers and text fields through functions such as, but not limited to alphabetizing, ranking, sorting, querying, and/or filtering.

Applications

As mentioned above, and as set forth in FIG. 8, applications 101 utilize tools 110 and the data objects 103 found in the platform 105. As also mentioned above, the finder application 135 can be an application for finding, organizing, creating, and/or sharing data (e.g., geospatial data) in common formats.

The mapmaker application 125 can be an application for assembling maps utilizing data objects 103 with any of the tools 110. The mapmaker application 125 can mix and remix maps, and combine different data objects (as layers) to create cartographical masterpieces. The mapmaker application 125 can utilize the finder, visualizer and/or analyzer tools to create multi-layers maps. (See FIG. 8.) Mapmaker 125 provides access to visualizer 140, analyzer 145, and explorer 150 so that users can manufacture layers for their map. Mapmaker 125 serves as a tool by which to place those layers on a map in an organized way. All the layers come from data objects 103 that are created from the serialized data in the object store 102, so there are no issue with different file formats. The system deals with the different file formats without the user ever knowing the data was originally in other formats. The users simply see the content of the data as standard layers.

The atlas application 130 can help create a collaborative community built around the concept that maps tell stories that are enhanced when integrated with multimedia including, but not limited to, words, photos, video, and/or graphs. The atlas application 130 can find, browse and interact with maps. It can also seamlessly interact with the mapmaker application 125 to convert map consumers into map producers. (See FIG. 8). In one embodiment, the atlas application 130 can be considered a multi-user blog where a user can embed third party objects in addition to data objects 103 provided within the platform 105 allowing a variety of media and data objects to be placed on an atlas page. Any of the third party objects can be considered a reusable widget because they can include a snippet of code which can be used to reproduce the object. These reusable widgets can also include any map created with map maker and any page created with atlas. What a user sees on the map or page is recreated on a third party web page through the snippet of code associated with the widget.

Figure 9:
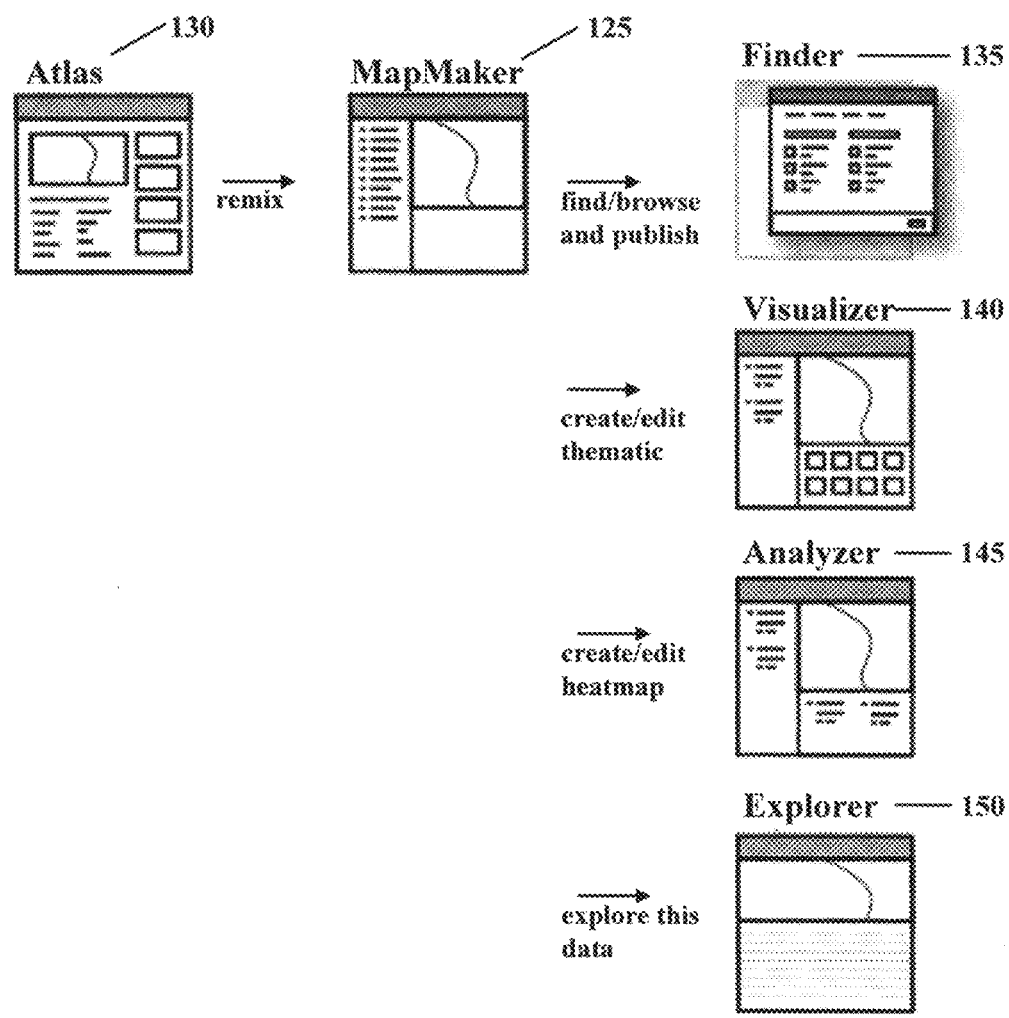

In one embodiment, a method and system are provided for using the above applications in social network which accesses the platform 105 to allow users to search for disparate data objects 103, integrate the data objects 103 on a map, and analyze the data objects 103 for decision support. The system can also allow non technical users to easily locate data objects 103 that can be mapped to solve a problem and also easily integrate data objects 103 to a map. As described below in FIG. 9-19, in one embodiment, the system and method allows a user to log in, establish a profile describing their data objects 103 and subject matter interests, upload their own data objects 103, search for other user's data objects 103, combine their data objects 103 and other user's data objects 103 as layers on a map, and analyze the resulting data objects 103 to solve location based problems. FIG. 9 provides a flow diagram for this process with screen shots depicting the user interaction at each stage: atlas 130, mapmaker 125, tools 110 (finder 135, visualizer 140, analyzer 145, explorer 150). Each step of FIG. 9 is then broken out in FIGS. 10-19 illustrating what work flow occurs at each stage.

FIG. 10 illustrates a login screen on finder 135, according to one embodiment. This screen can be the entry gateway for the system that allows the user to log in and also features content from the platform 105 and members of the social networks. Once logged in the user can create a workspace using atlas 130 and/or mapmaker 125 (see e.g., FIGS. 15-18) combining multiple data objects 103. The most recently added data objects 103 and workspaces are monitored. Each data object 103 contributed to the social network is tagged by the users and other users can browse through tag categories built off of suggested controlled vocabularies (e.g., box 1001 with the list of categories) This entry (gateway screen can be general, or customized to a particular user, or a particular user's interest group.

FIG. 11 illustrates a user library page on finder 135, according to one embodiment. The library page can provide the user's collection of data objects 103 (which can be represented as layers on a map) that the user has customized with his/her own titles and annotations. When a user makes a data object 103 a favorite, the data object 103 is added to the user's library and the user can add annotations and change titles for his/her own use, but in one embodiment, those changes are local to them only and do not change the original data object 103 information and notes. The user can also have a tag list that will allow them to sort and categorize their data for easy filters and sorts. The library page can also contain biographical data about the users, comments about the user from the community, and the list of the data objects 103 the user has contributed and how the community has rated the data objects 103.

FIG. 12 illustrates an upload functionality in finder 135, according to one embodiment. The upload functionality allows users to upload a variety of data formats including proprietary formats that are then converted to an open standard specification that allows the data objects 103 to be easily shared in a service oriented architecture. Users are prompted to provide information describing the data object 103, tagging the data object 103, and explaining the attributes associated with the data object 103. This information is then tagged to the data object 103 and allows the data object 103 to be easily searched and managed.

FIG. 13 illustrates a search functionality in finder 135, according to one embodiment. The search functionality allows users to type in free text to identify data objects 103 they are interested in. A variety of objects can be search for through the system including but not limited to 1) users 2) data objects 103 3) tag's 4) data object attributes. The rank of search is based on a variety of factors including 1) popularity (how many times it has been utilized by the community 2) the reputation of the data object contributor 3) data object 103 rating 4) relevancy of the search terms to the data object 103. For instance, in addition to data objects 103 the search produces a set of related tags from the search set then ranks them based on the number of data objects 103 that have that tag. A user can mark as favorite any data object 103 result from the search and have that added to their library.

FIG. 14 illustrates a data profile functionality in finder 135, according to one embodiment. The data profile is a profile of the metadata associated with the data object reference 106 explaining a data object 103. The profile includes, but is not limited to: data dictionary, data description, data title, number of attributes, number of features, source, date, contributing users, and semantic relationships. Users can interact (e.g., by being able to contact a user, comment on their data objects, etc.) with the contributor generated description of the data object 103 and also download the data object 103 from the system for use in a third party application.

Figure 15:
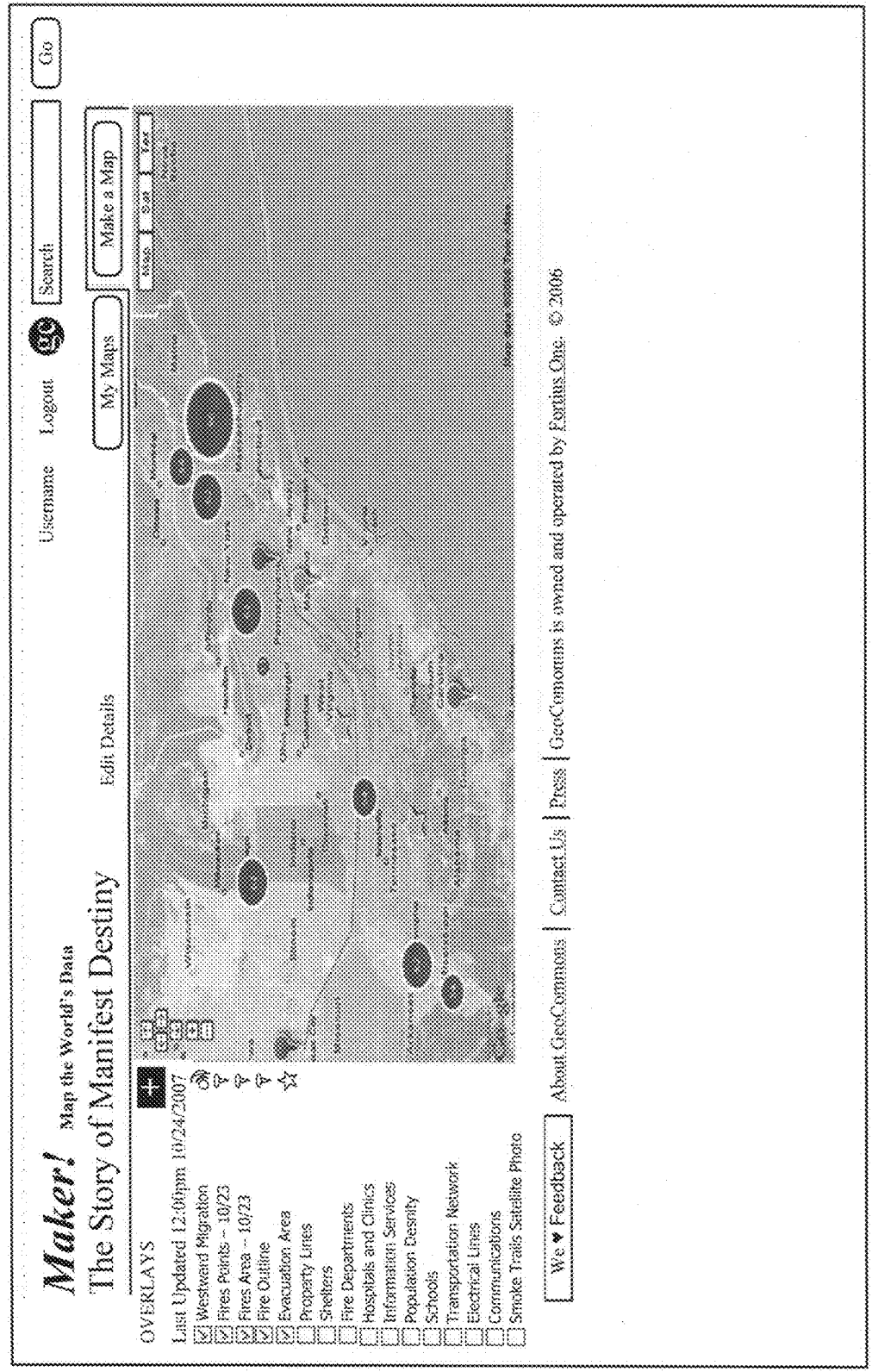

FIG. 15 illustrates a workspace in mapmaker 125, according to one embodiment. The workspace allows the system to orchestrate disparate data objects (e.g., as layers) on a map. The platform 105 contains the local store of data objects 103 available to the user to orchestrate on the map. The workspace can be exported to a third party web page as portable pieces of code implanted into a HTML page or can be exported as a single file that can be opened in third party applications.

FIG. 16 illustrates a workspace management tool in mapmaker 125, according to one embodiment. The workspace management tool allows a user to manage their maps of data objects 103 and view information about them. They can also do a search to locate the appropriate map and share that map as a widget (embeddable web component) on a third party web page. Maps are given titles, descriptions and tags with keywords (see, e.g., categories 1001 in FIG. 10 and 1101 in FIG. 11). These titles, descriptions, tags, can be searched to allow other users to locate data objects 103 based on the text used to describe them.

Figure 17:

FIG. 17 illustrates a multi media and collaborative platform in atlas 130, according to one embodiment. The platform allows users to post their maps and tell the story associated with them. A user can click a button that embeds a map in the atlas. Since all of the maps have the ability to produce embeddable code recreating them on another web page (in the system or not) it is easy for a person of ordinary skill to recreate the map—they either click the button or cut and paste the code on to a page to do so. Users viewing the atlas page can participate with it by leaving comments as annotations on the map. To annotate a map, the user clicks on the map in the location they would like to leave an annotation. They are then prompted to enter the annotation (e.g., using text, HTML, photos or video) and that annotation is stored in the database with the latitude and longitude the user clicked on the map. A user can also leave annotations on the atlas in the space off the map. These annotations are then associated with the appropriate layer or layers on the maps inheriting their tags. Each of the layers on a map is associated with a data object and each of these data objects has tags. When the annotation is placed in the database with its content and latitude and longitude coordinates, it also replicates the tags of the data objects it has been associated with on the map. For example, if a user was looking at a map of crimes with a map layer of robberies in San Francisco tagged crime, robberies, theft, and added a comment to the map, the annotation would inherit the tags of the map layer and be tagged with crime, robberies, and theft by the system.

FIG. 18 illustrates stories in atlas 130, according to one embodiment. Users can easily browse through stories in the atlas 130 or do an integrated search for content across the system.

FIG. 19 illustrates a flowchart for an upload of data to the system 100, according to one embodiment. In 1905, a user connects to the system 100 and selects finder 135 and chooses to upload a file in Shapefile format. In 1910, finder 135 connects the request with the platform 105. In 1915, the Shapefile is converted into a data object 103, which is then serialized and assigned a hash. In 1920, the hash is stored as a reference to the serialized data that creates the data object 103 that can be queried against.

FIG. 20 illustrates a flowchart for a download of data from the system 100, according to one embodiment. In 2005, the user connects to the system 100 and selects finder 135 and choose to search for a layer and downloads it as a KML. In 2010, the finder 135 connects the request made with the platform 105. In 2015, the data object reference 106 for the requested layer is queried. In 2020, the data object reference 106 is used to identify the correct serialized data, which is converted into data object 103, which is converted into KML file format. In 2025, the user receives the KML download.

FIG. 21 illustrates a flowchart for map creation, according to one embodiment. In 2105, the user connects to the system 100 and selects mapmaker 125. In 2110, the user chooses a layer and a style for the layer. In 2115, the finder 135 connects the request with platform 105. In 2120, the data object reference 106 for the layer is queried. (If there was already a layer, a semantic link would be made between the layers.) In 2125, the hash is used to identify the correct data object 103, which is converted to a layer that can be styled. In 2130, the visualizer 140 styles the layer based on the user's instructions. In 2135, the user views the map with the requested layer and style.

Figure 22:
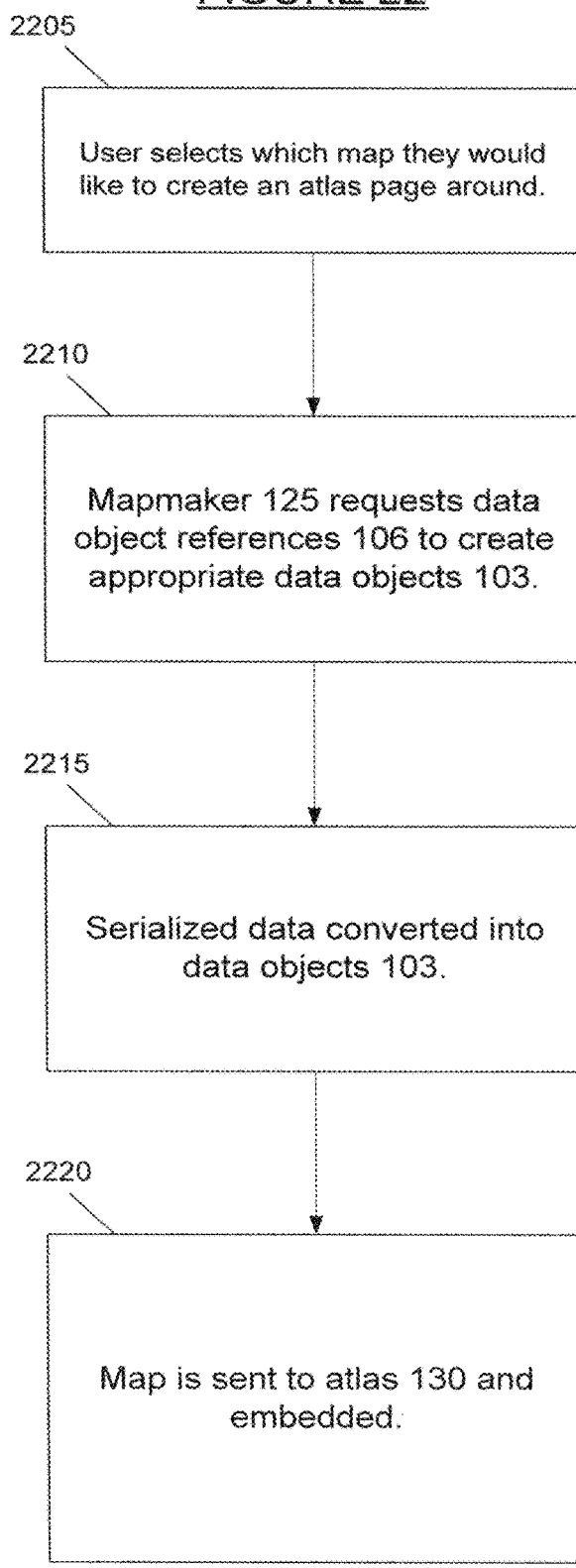

FIG. 22 illustrates a flowchart for embedding a map from mapmaker 125 into atlas 130, according to one embodiment. In 2205, the user selects which map they would like to create an atlas page around. In 2210, the mapmaker 125 requests the data object reference 106 which can create the appropriate data objects 103. In 2215, the serialized data is converted into the data objects 103 (layers) as embeddable code needed for the map. In 2220, the map is sent to atlas 130 and embedded.

FIG. 23 illustrates a flowchart for running explorer 150 in mapmaker 125, according to one embodiment. In 2305, the user selects a query of the data object 103 they have loaded using explorer 150. In 2310, the explorer 150 connects to mapmaker 125 and sends a request to the platform 105 for the query initiated by the user. In 2315, the platform locates the data object reference 106 and converts it into the data object 103 (which becomes the map layers). In 2320, a query is run on the data object to extract the subset of data requested by the user. The user now has a new layer in mapmaker 125 illustrating the result of their query.

FIG. 24 illustrates a flowchart for running analyzer 145 from mapmaker 125. In 2405, the user selects a map layer in mapmaker 125 to analyze. In 2410, the analyzer 145 connects to mapmaker 125 and sends a request to the platform 105 for data layers and analysis to be performed on them. In 2415, the data object references 106 are located and create the appropriate data objects 103 to run the analysis on. In 2420, the requested analysis is run on the data objects 103 and the results are converted into a new layer. The layer with the analysis is sent back to mapmaker 125 through analyzer 145. The user now has a new layer in mapmaker 125 which illustrates the results of the analysis.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

The invention claimed is:

1. A method for connecting at least one social network to at least one geospatial data repository, comprising:
   accepting geospatial data from at least one user utilizing at least one processor, wherein the geospatial data is entered in at least one data format of at least two data formats supported by the method, the at least two data formats supported by the method comprising data formats other than a global positioning system (GPS) data format or in addition to the GPS data format;
   serializing the geospatial data to create data objects and data object references, wherein the data object references are identifiers for the serialized geospatial data and are used to create the data objects;
   retrieving the data objects utilizing the at least one processor, according to their corresponding data object references, wherein the serialized geospatial data is converted into a common format to create the retrieved data objects;
   linking the retrieved data objects to at least one associated user in the at least one social network utilizing the at least one processor;
   creating at least one map as requested by the at least one user comprising the retrieved data objects using the at least one processor;
   creating, using the at least one processor, semantic relationships for the social network between the retrieved data objects according to a user action by the at least one user on the at least one map; and
   recommending related data objects when the at least one user searches at least one data object using the at least one processor, the related data objects determined using the semantic relationships of the social network.

2. The method of claim 1, wherein the serialized geospatial data has at least one data object identifier which links to at least one corresponding data object in order to allow the geospatial data to be easily searched and/or combined.

3. The method of claim 1, wherein search results of searched geospatial data is ranked based on reputation of at least one contributor of content.

4. The method of claim 1, wherein semantic relationships are utilized to analyze the geospatial data.

5. The method of claim 1, wherein the geospatial data is entered in different formats.

6. The method of claim 1, wherein the at least one format of the at least two data formats supported by the method further comprise at least one GIS data format.

7. The method of claim 6, wherein the at least one GIS data format comprises: a Shapefile format, a Geographic Resources Analysis Support System (GRASS) format, or an OpenGIS Simple Features Reference Implementation (OGR) format, or any combination thereof.

8. The method of claim 1, wherein the at least one format of the at least two data formats supported by the method further comprises at least one OGC format.

9. The method of claim 8, wherein the at least one OCG format comprises: a Geographic Markup Language (GML) format, a Web Feature Service (WFS) format, an Open Geospatial Consortium's (OGC) SLD format, or any combination thereof.

10. The method of claim 1, wherein the at least one format of the at least two data formats supported by the method further comprises at least one Geospatial database format.

11. The method of claim 10, wherein the at least one Geospatial database format comprises: a Topologically Integrated Geographic Encoding and Referencing system (TIGER) format, a Postgres Structured Query Language for Geographic Information Systems (PostGIS) format, or an Oracle Spatial format, or any combination thereof.

12. The method of claim 1, wherein the at least one format of the at least two data formats supported by the method further comprises at least one Web format.

13. The method of claim 12, wherein the at least one Web format comprises: a JavaScript Object Notation format, a Really Simple Syndication format, or a Keyhole Markup Language (KML) format, or any combination thereof.

14. The method of claim 1, wherein the at least one format of the at least two data formats supported by the method further comprises at least one text format.

15. The method of claim 14, wherein the at least one text format comprises: a Comma Separated Value (CSV) format and/or a delimited text format.

16. A system for connecting a social network to a geospatial data repository, comprising a computer with an application for:

performing processing comprising accepting geospatial data from at least one user utilizing at least one processor, wherein the data objects are entered in at least one data format of at least two data formats supported by the system, the at least two data formats supported by the system comprising data formats other than a global positioning system (GPS) data format or in addition to the GPS data format;

performing processing comprising serializing the geospatial data to create data objects and data object references, wherein the data object references are identifiers for the serialized geospatial data and are used to create the data objects;

performing processing comprising retrieving the data objects utilizing the at least one processor, according to their corresponding data object references, wherein the serialized geospatial data is converted into a common format to create the retrieved data objects;

performing processing comprising linking the retrieved data objects to at least one associated user in the at least one social network utilizing the at least one processor;

creating at least one map as requested by the at least one associated user comprising the retrieved data objects using the at least one processor;

performing processing comprising creating, using the at least one processor, semantic relationships for the social network between the retrieved data objects according to a user action by the at least one associated user on the at least one map; and performing processing comprising recommending related data objects when the at least one user searches at least one data object using the at least one processor, the related data objects determined using the semantic relationships of the social network.

17. The system of claim 16, wherein the serialized geospatial data has at least one data object identifier which links to at least one corresponding data object in order to allow the geospatial data to be easily searched and/or combined.

18. The system of claim 16, wherein search results of searched geospatial data is ranked based on reputation of at least one contributor of content.

19. The system of claim 16, wherein semantic relationships are utilized to analyze the geospatial data.

20. The system of claim 16, wherein the geospatial data is entered into the system in different formats.

* * * * *